(12) United States Patent
Tsunashima

(10) Patent No.: US 7,783,076 B2
(45) Date of Patent: Aug. 24, 2010

(54) MOVING-OBJECT TRACKING CONTROL APPARATUS, MOVING-OBJECT TRACKING SYSTEM, MOVING-OBJECT TRACKING CONTROL METHOD, AND PROGRAM

(75) Inventor: Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 11/428,968

(22) Filed: Jul. 6, 2006

(65) Prior Publication Data

US 2007/0014432 A1    Jan. 18, 2007

(30) Foreign Application Priority Data

Jul. 15, 2005  (JP) .............. 2005-206339

(51) Int. Cl.
*G06K 9/00* (2006.01)
(52) U.S. Cl. .............. 382/103; 382/107; 348/416.1; 375/240.16
(58) Field of Classification Search .............. 382/103, 382/107; 375/240.16; 348/416.1
See application file for complete search history.

(56) References Cited

U.S. PATENT DOCUMENTS 5,943,445 A * 8/1999 Dufaux ............... 382/236
6,507,366 B1 * 1/2003 Lee .................... 348/352
7,142,600 B1 * 11/2006 Schonfeld et al. ...... 375/240.16
2002/0054211 A1 * 5/2002 Edelson et al. ......... 348/169
2005/0195278 A1 * 9/2005 Nair .................... 348/143

OTHER PUBLICATIONS

J.C. Clarke, A. Zisserman, Detection and Tracking of Independent Motio, Image Vision Computing 1996.*
Yeping Su, et al. Global Motion Estimation From Coarsely Sampled Motion Vector Field and the Applications, IEEE 2005.*
S.M. Smith, Real-Time Motion Segmentation and Shape Tracking, Defence Research Agency UK, 1995.*

\* cited by examiner

*Primary Examiner*—Wesley Tucker
*Assistant Examiner*—Mark Roz
(74) *Attorney, Agent, or Firm*—Oblon, Spivak, McClelland, Maier & Neustadt, L.L.P.

(57) ABSTRACT

A moving-object region is specified on an image captured by an imaging apparatus, and a plurality of calculation points are arranged on the specified region. A group of local motion vectors is determined for the calculation points, and a moving-object motion vector is obtained based on the determined local motion vectors. A group of calculation points whose local motion vectors are the same as or similar to the moving-object motion vector is continuously used to calculate the local motion vectors, and is updated by moving the position of the group of calculation points along the moving-object motion vector, and a calculation point whose local motion vector is different from the moving-object motion vector is rearranged by placing a new calculation point at a position near any of the continuously used calculation points. A movable mechanism including the imaging apparatus is controlled in accordance with the moving-object motion vector.

22 Claims, 18 Drawing Sheets

FIG. 8
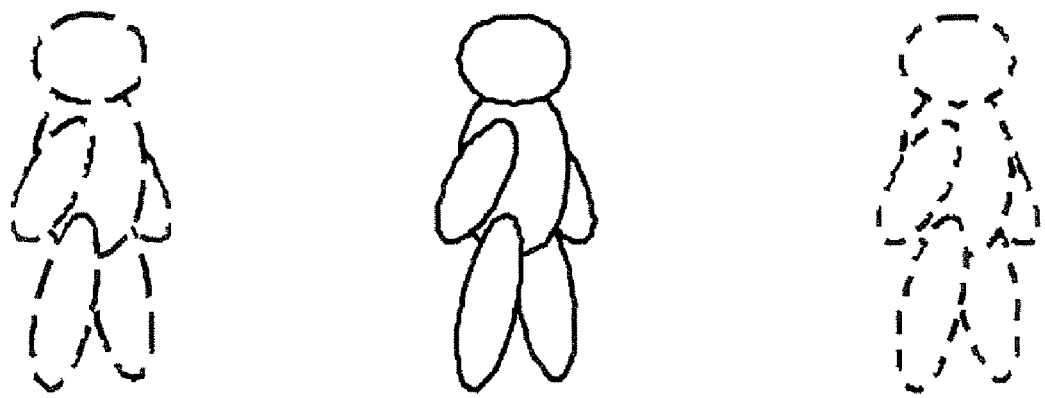
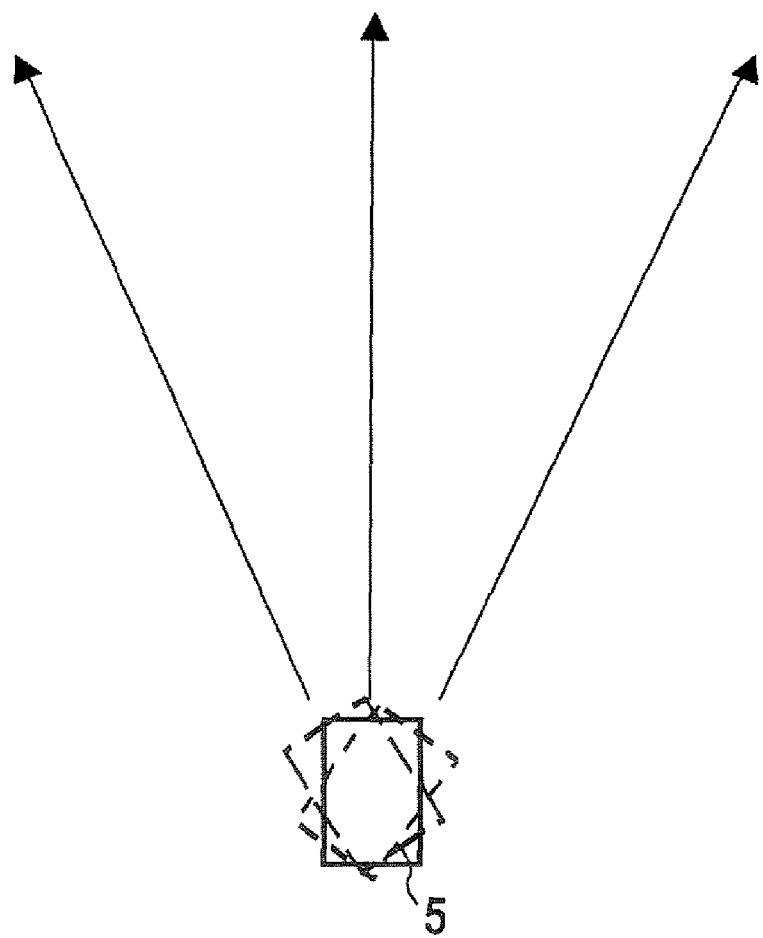

FIG. 10A
WITHOUT ROTATION
FIG. 10B
WITH ROTATION
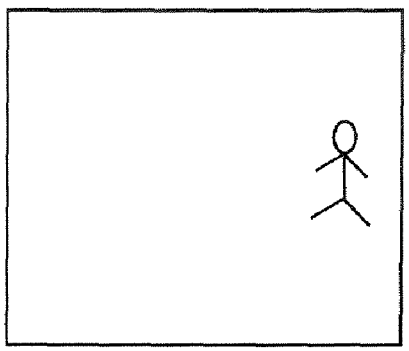
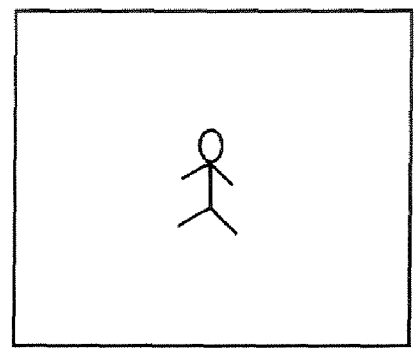
TIME t1
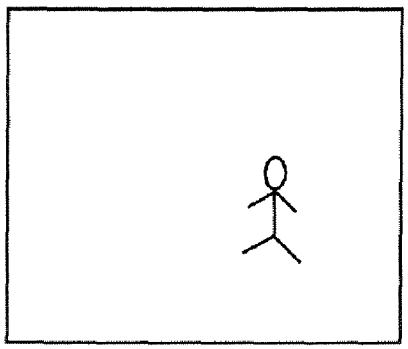
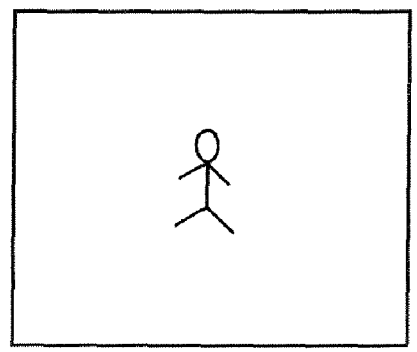
TIME t2
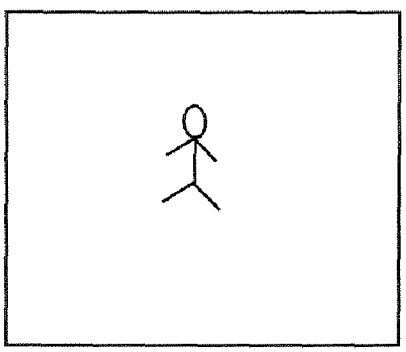
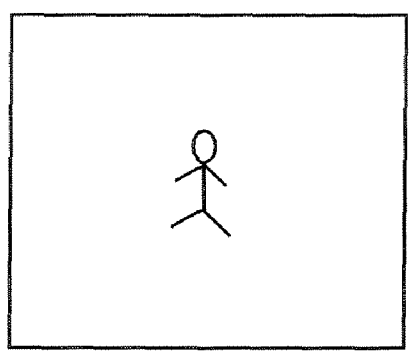
TIME t3
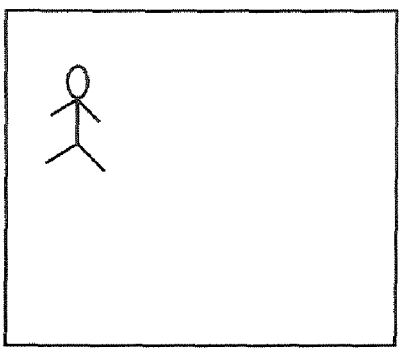
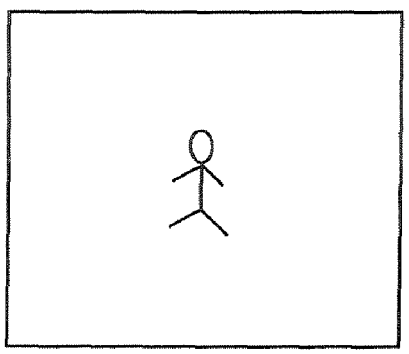
TIME t4

FIG. 11A
RELATED ART
FIG. 11B
EMBODIMENT
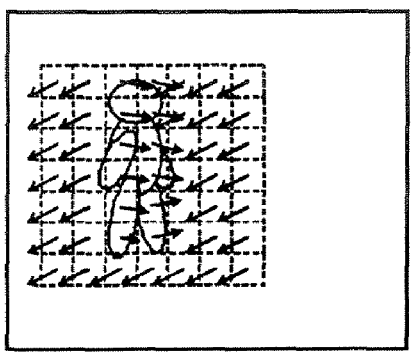
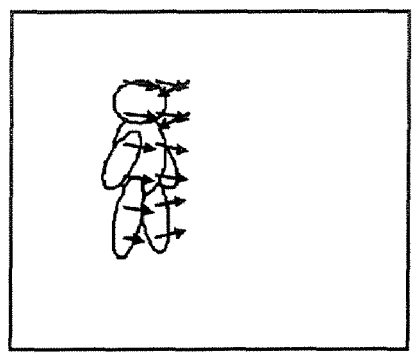
TIME t1
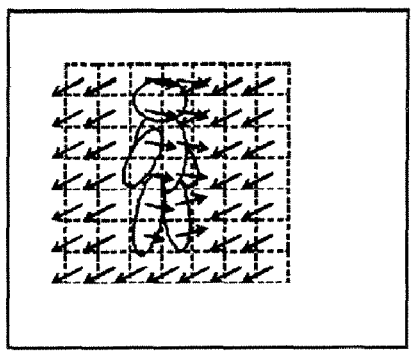
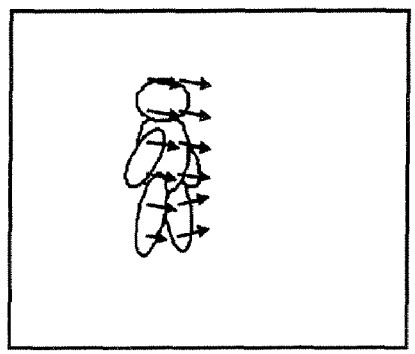
TIME t2
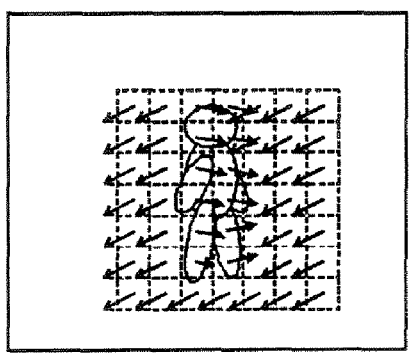
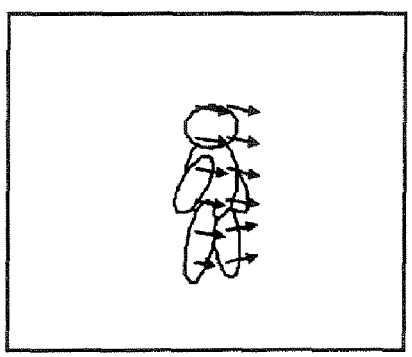
TIME t3
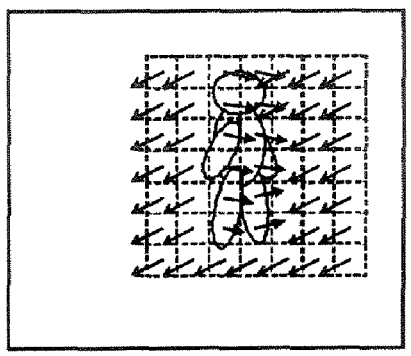
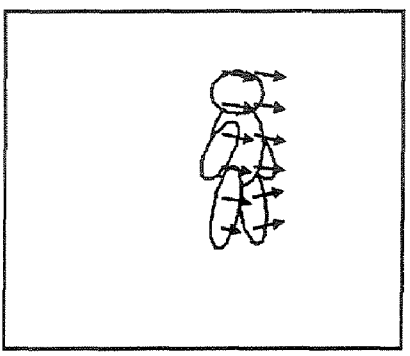
TIME t4

FIG. 13A
WITHOUT ZOOM
FIG. 13B
AFTER ZOOM ADJUSTMENT
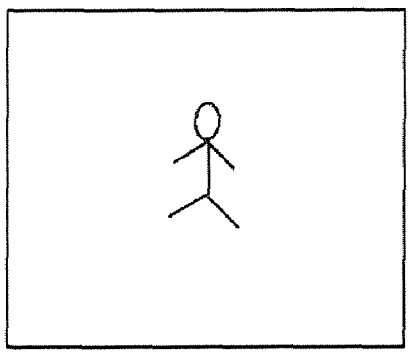
TIME t1
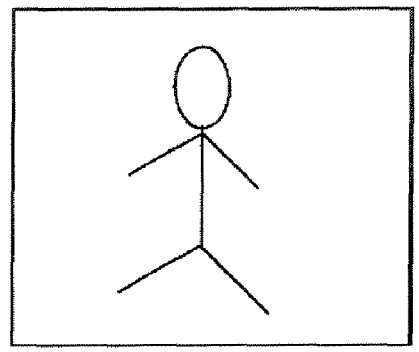
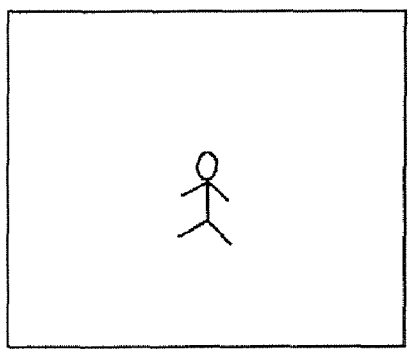
TIME t2
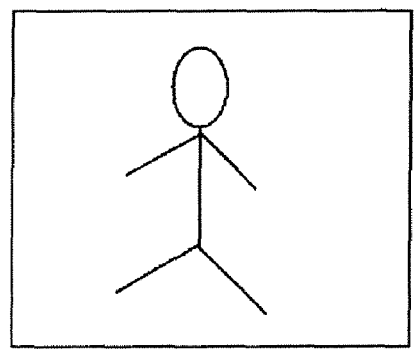
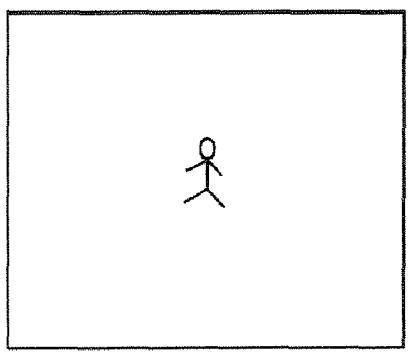
TIME t3
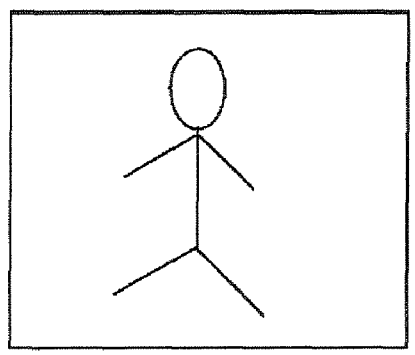
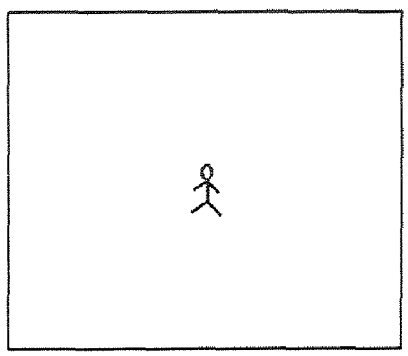
TIME t4
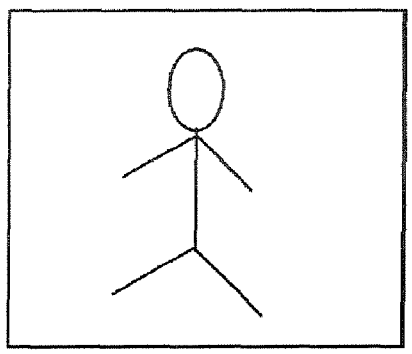

FIG. 16
(A) TIME t1
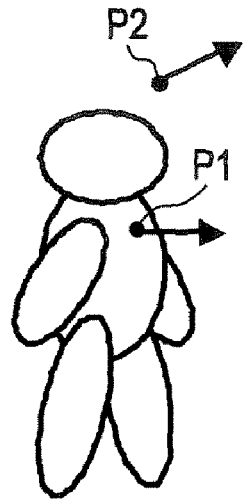
(B) TIME t2
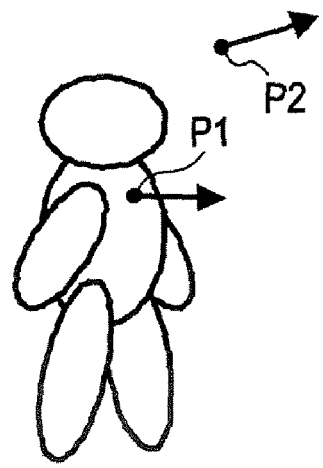
(C) TIME t3

MOVING-OBJECT TRACKING CONTROL APPARATUS, MOVING-OBJECT TRACKING SYSTEM, MOVING-OBJECT TRACKING CONTROL METHOD, AND PROGRAM

CROSS REFERENCES TO RELATED APPLICATIONS

The present invention contains subject matter related to Japanese Patent Application JP 2005-206339 filed in the Japanese Patent Office on Jul. 15, 2005, the entire contents of which are incorporated herein by reference.

BACKGROUND OF THE INVENTION

1. Field of the Invention

An embodiment of the present invention relates to a moving-object tracking control apparatus for controlling tracking of a moving object moving on a screen. Another embodiment of the present invention relates to a system including the moving-object tracking control apparatus.

A further embodiment of the present invention relates to a method and program for implementing the moving-object tracking control function.

2. Description of the Related Art

In monitoring systems, the capability (tracking capability) of tracking a moving target (e.g., a person, a vehicle, or other objects) through images on the screen captured by an imaging apparatus, such as a monitoring camera, is important. For example, when a monitoring camera is used to monitor a "keep out" zone, it is important to track and record the behavior of an intruder in the zone.

A monitoring camera whose imaging direction is fixed can detect and track an intruder by using a moving-object detection technique (e.g., C. Stuffer, W. E. L. Grimson, "Adaptive background mixture models for real-time tracking").

However, the fixed monitoring camera can only track an intruder within its imaging coverage. If the intruder moves outside the imaging coverage of the camera, the camera can no longer track the intruder.

Therefore, movable monitoring systems of the type in which the imaging direction of monitoring cameras is variable have been used. In a movable monitoring system, a monitoring camera is mounted on a rotating turntable to expand the tracking area beyond the imaging coverage of the camera. The monitoring camera is rotated in accordance with the movement of an intruder so that the intruder can be constantly shot within the imaging coverage of the camera.

In the movable monitoring systems, however, it is difficult to detect an intruder using the above-described moving-object detection processing during the rotation of the camera. In the moving-object detection processing, moving objects, such as an intruder, are defined as the foreground objects while other objects are defined as the background objects, and a moving target is detected on the assumption of the stationary background and the moving foreground. In the movable monitoring systems, however, both foreground objects and background objects move in accordance with the rotation of the imaging camera, and thus the assumption of the moving-object detection processing is not satisfied.

The tracking operation with a monitoring camera rotated may be divided into two phases, that is, a moving-object detecting phase and a moving-object tracking phase.

The moving-object detecting phase is a processing phase for performing the above-described moving-object detection processing in a state where the monitoring camera is held stationary to detect a moving object or target to be tracked. When the moving target is detected, a transition to the moving-object tracking phase occurs, and the moving target is tracked with the imaging camera rotated. In the moving-object tracking phase, a method capable of detecting the moving target even during the rotation of the monitoring camera is employed. At the end of the moving-object tracking procedure, the imaging camera is stopped, and a transition back to the moving-object detecting phase occurs.

A moving-object detection method of the related art employed in the moving-object detecting phase is disclosed in Japanese Unexamined Patent Application Publication No. 2003-39387. In this method, motion vectors are calculated for a target to be tracked and its surrounding area, and a motion vector to be tracked is determined. FIG. 1 shows an example of the motion vectors determined by this detection method. As shown in FIG. 1, in this moving-object detection method, since the motion vectors determined for a target to be tracked (in this example, a person) differ from those for the background objects behind the target, the difference therebetween is utilized to select only the motion vectors for the target. This detection method enables the determination of the position of the target to be tracked even during the rotation of the imaging camera.

SUMMARY OF THE INVENTION

However, this detection method has the following two problems.

The first problem relates to the processing time. In this detection method, motion vectors are determined for not only a target to be tracked but also its surrounding area. In addition, the larger the size of the target to be tracked, the more the motion vectors are to be determined for the area surrounding the target to be tracked. The processing time therefore increases.

The second problem is that the determination processing becomes less stable when, as shown in FIG. 2, a moving object exists near the target to be tracked.

Accordingly, the present inventor proposes a first moving-object tracking technique including the following processing functions:

a processing function for specifying a moving-object region on an image captured by an imaging apparatus;

a processing function for arranging a plurality of calculation points on the specified moving-object region;

a processing function for determining a group of local motion vectors for the calculation points;

a processing function for obtaining a moving-object motion vector based on the group of local motion vectors;

a processing function for updating the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and a processing function for controlling a movable mechanism including the imaging apparatus in accordance with the moving-object motion vector.

The present inventor further proposes a second moving-object tracking technique including the following processing functions:

a processing function for specifying a moving-object region on an image captured by an imaging apparatus or a moving-object region on an image read from a server;

a processing function for arranging a plurality of calculation points on the specified moving-object region;

a processing function for determining a group of local motion vectors for the calculation points;

a processing function for obtaining a moving-object motion vector based on the group of local motion vectors;

a processing function for updating the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and a processing function for controlling so as to move a region extracted from the image in accordance with the moving-object motion vector.

According to an embodiment of the present invention, a calculation point of a local motion vector is continuously used or rearranged in accordance with the movement of a moving target. That is, even during a tracking operation, local motion vectors are determined only for the same number of calculation points as that used when the moving target is detected. Therefore, the tracking process of the moving target can be performed with a small amount of computation.

Further, the local motion vectors are continuously calculated only for the calculation points positioned in the moving-object region. Thus, even if another moving object approaches close to the moving target being tracked, the calculation of the local motion vectors can be continuously performed without being affected by the moving object. Therefore, a stable moving-object tracking process can be achieved.

BRIEF DESCRIPTION OF THE DRAWINGS

FIG. 8 is a diagram showing images tracked in the imaging direction in accordance with the movement of a moving object;

FIGS. 10A and 10B are diagrams showing examples of the display screen;

FIGS. 11A and 11B are schematic diagrams showing the difference in the amount of computation needed between the related art and the first embodiment;

FIGS. 13A and 13B are diagrams showing a change in captured images as the moving target moves farther from the photographer;

FIG. 16 is a diagram showing an example of the operation in which a certain period of time is suspended until a calculation point is rearranged;

DESCRIPTION OF THE PREFERRED EMBODIMENTS

A moving-object tracking system according to an embodiment of the present invention will be described.

It is to be noted that a technique that is common knowledge or is well known in the art is employed unless stated or illustrated otherwise in the document.

The following embodiments are exemplary embodiments of the present invention, and the present invention is not limited to these embodiments.

First Embodiment

Overall Structure of Moving-Object Tracking System

Figure 1:
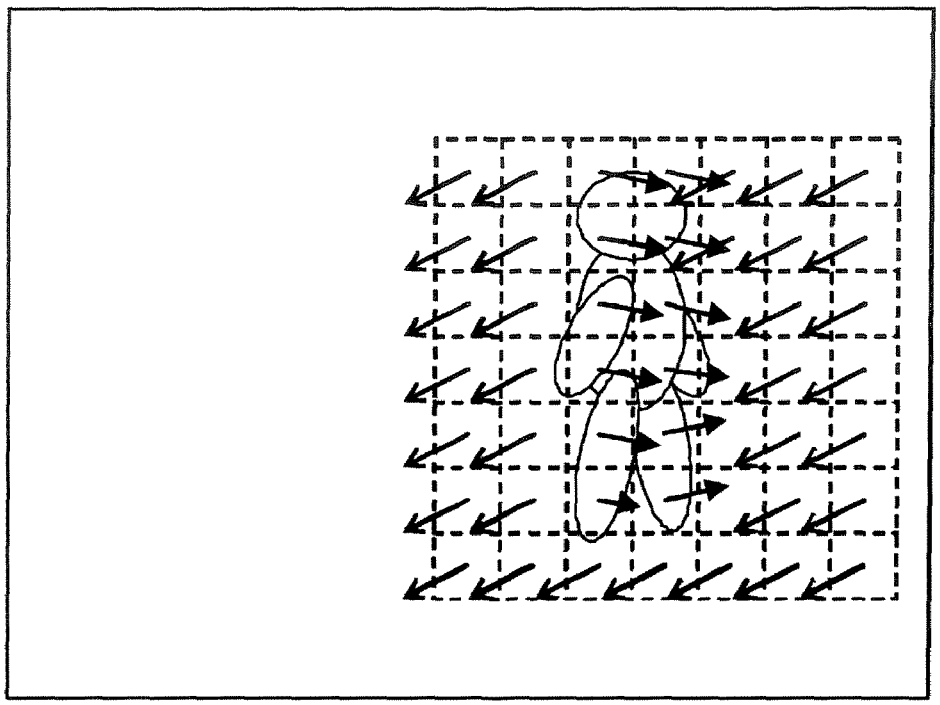
FIG. 1 is a diagram showing an example of motion vectors determined by a method of the related art.
Figure 2:
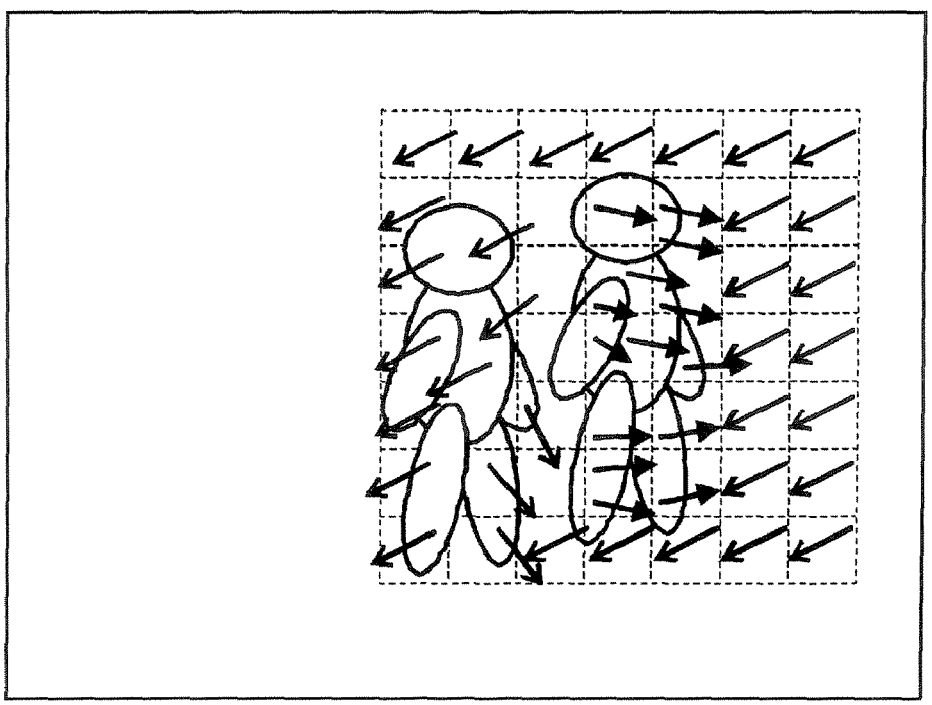
FIG. 2 is a diagram showing an example of an image in a case where motion vectors are determined by the method of the related art in an unstable manner.
Figure 3:
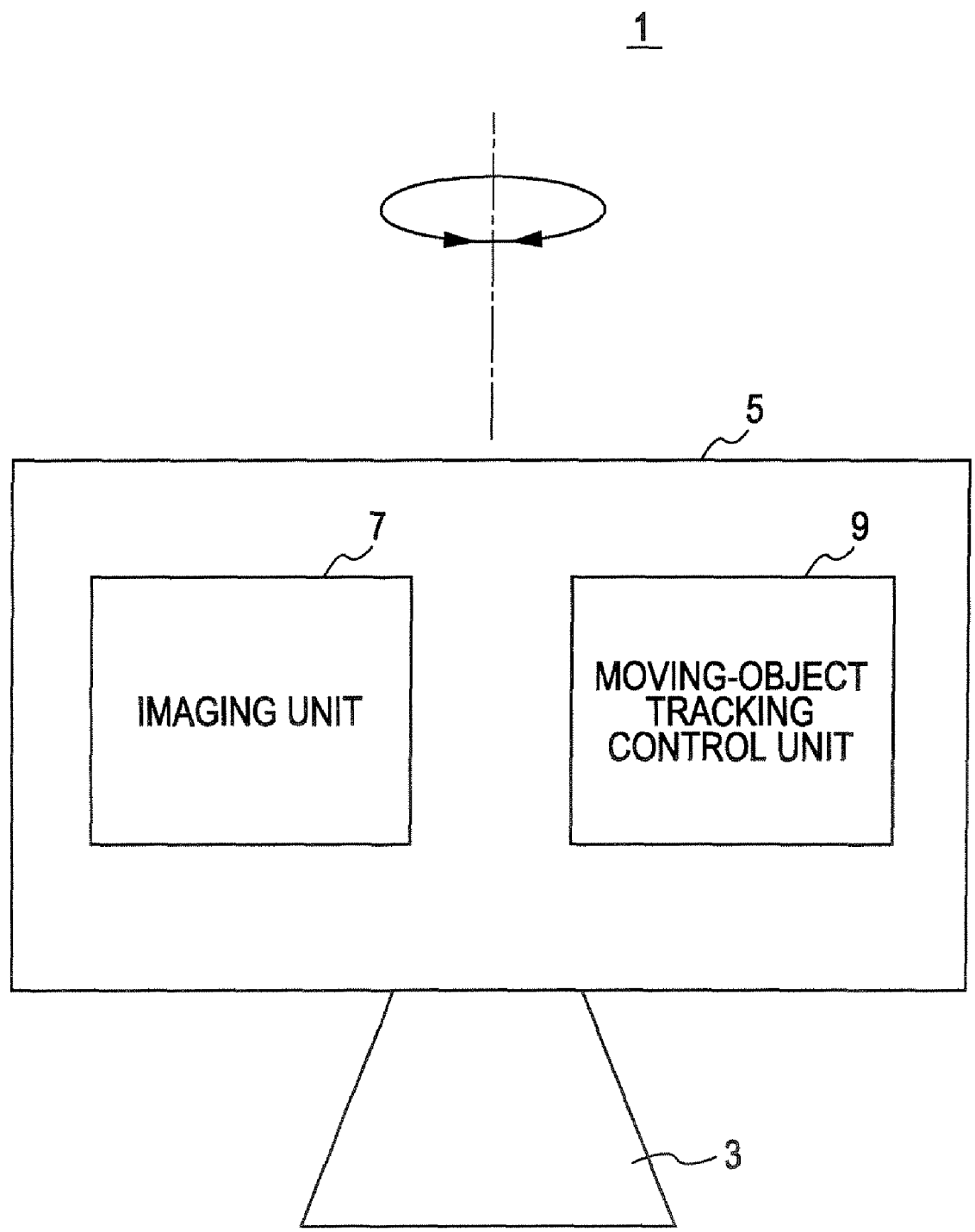
FIG. 3 is a diagram showing an example structure of a moving-object tracking system according to a first embodiment of the present invention.

FIG. 3 shows an example structure of a moving-object tracking system 1 according to a first embodiment of the present invention. The moving-object tracking system 1 is a system in which an imaging apparatus 5 mounted on a rotating stage 3 (movable mechanism) includes a moving-object tracking control apparatus. The rotating stage 3 and the imaging apparatus 5 may be integrally formed or removably attached to each other.

The imaging apparatus 5 includes an imaging unit 7 and a moving-object tracking control unit (hereinafter also referred to as a "moving-object tracking control apparatus") 9. The imaging unit 7 is formed of an imaging device, such as a charge-coupled device (CCD) sensor or a complementary metal oxide semiconductor (CMOS) sensor, an optical lens, and other components.

The rotating stage 3 is a movable mechanism capable of driving the imaging apparatus 5 mounted thereon so that the imaging direction can be oriented horizontally.

Structure of Moving-Object Tracking Control Apparatus

Figure 4:
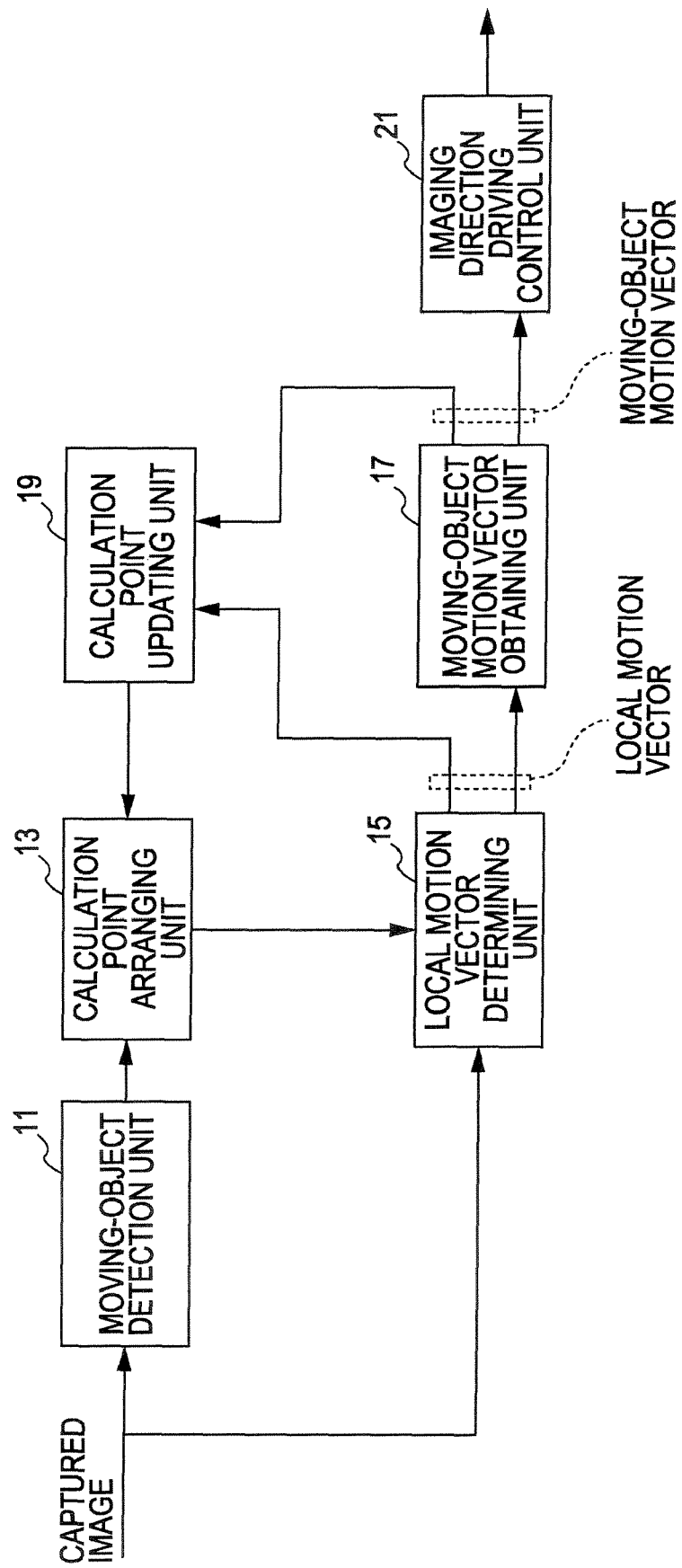
FIG. 4 is a diagram showing an example functional structure of a moving-object tracking control apparatus according to the first embodiment.

FIG. 4 shows an example functional structure of the moving-object tracking control apparatus 9.

The moving-object tracking control apparatus 9 includes function units, that is, a moving-object detection unit 11, a calculation point arranging unit 13, a local motion vector determining unit 15, a moving-object motion vector obtaining unit 17, a calculation point updating unit 19, and an imaging direction driving control unit 21.

The moving-object detection unit 11 is a processing function for detecting a moving-object region on an image captured by the imaging unit 7. The moving-object region is detected by, for example, comparing two images captured with the imaging direction fixed. The moving-object detection unit 11 is an example of a moving-object specifying unit in the appended claims.

The calculation point arranging unit 13 is a processing function for arranging a plurality of calculation points on the specified moving-object region. The calculation points are used to determine local motion vectors. The calculation points may be arranged randomly throughout the moving-object region, may be arranged uniformly on the moving-object region, may be arranged in the vicinity of a feature point (e.g., an edge or a corner) in the moving-object region, or the like. It is preferable to select an appropriate arranging method depending on the picture.

Figure 5:
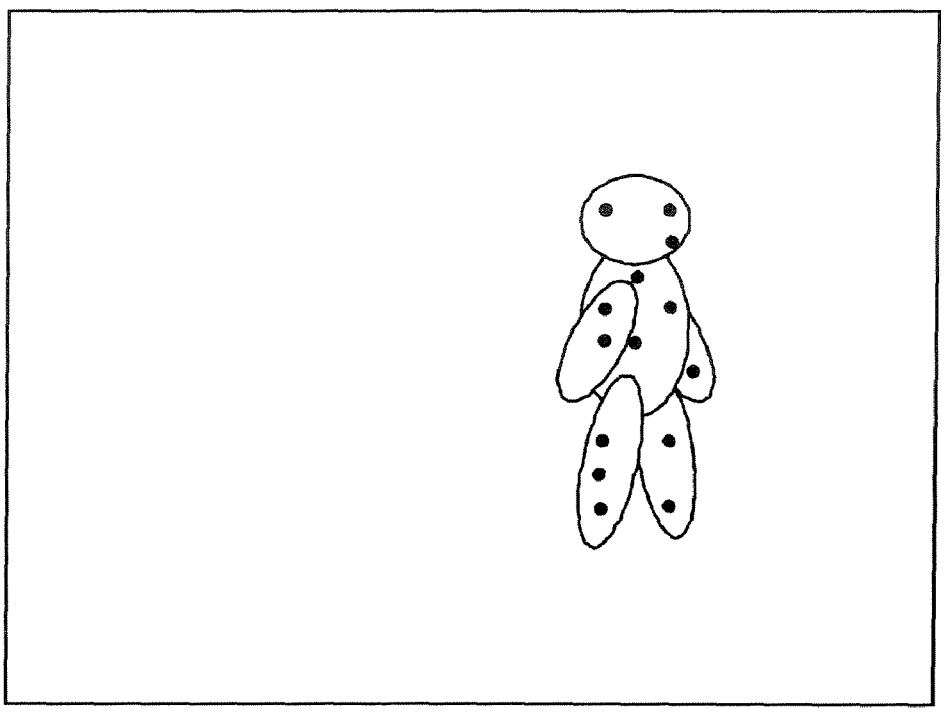
FIG. 5 is a diagram showing an example of the arrangement of calculation points.

FIG. 5 shows an example of the arrangement of calculation points (which are represented by black circles). In FIG. 5, the moving object is a person.

Figure 6:
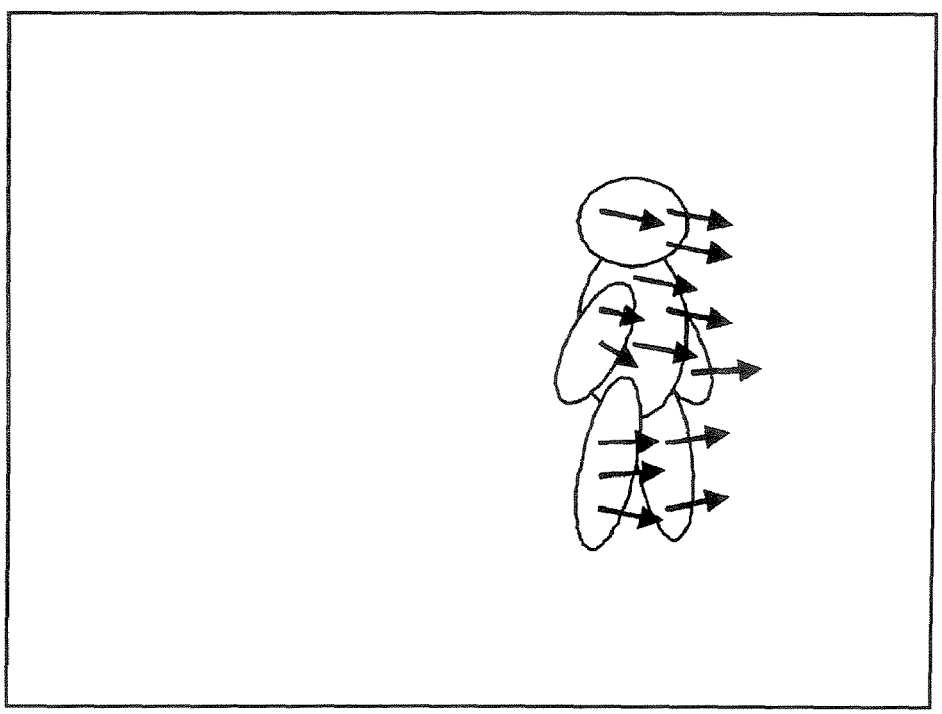
FIG. 6 is a diagram showing an example of local motion vectors determined for the individual calculation points.

The local motion vector determining unit 15 is a processing device for determining a group of local motion vectors for the calculation points. The local motion vectors are determined only for the calculation points. A motion vector is determined by, for example, performing a search process in which a reference area is set surrounding calculation points and an image obtained a unit of time before is used as a reference image. Generally, a search method, such as a block matching method or a gradient-based search method, is employed. The image obtained the unit of time before is prepared in advance. FIG. 6 shows an example of the local motion vectors determined for the calculation points.

The moving-object motion vector obtaining unit 17 is a processing function for obtaining a moving-object motion vector based on the group of local motion vectors. This results from the fact that all of the group of local motion vectors do not have the same value.

Generally, the local motion vectors determined for the calculation points positioned on the moving-object region have substantially the same value.

However, if the moving target is a non-rigid object such as a human body, movements may differ depending on the part of the body or the place. Further, due to the effect of noise or because of no features, such as no change in brightness of the image, around the positioned points, local motion vectors with different values may be determined.

Thus, the moving-object motion vector obtaining unit 17 obtains a moving-object motion vector indicating the overall movement of the moving target from all of the local motion vectors determined for the calculation points.

For example, the frequency of occurrence of each of the local motion vectors represented by the horizontal and vertical components (two-dimensional representation) of the image is calculated, and the local motion vector having the highest frequency is used as the moving-object motion vector. Alternatively, for example, the moving-object motion vector is determined as the arithmetic approximation determined with respect to a group of local motion vectors. The arithmetic approximation is given by, for example, the mean value of all of the local motion vectors.

The calculation point updating unit 19 is a processing function for updating the position of a calculation point to be used to determine a local motion vector after the start of the moving-object tracking operation. That is, the calculation point updating unit 19 is a processing function for updating the position so that the calculation points set in the moving-object detection processing can be continuously used (or can be rearranged) even after the transition from the moving-object detection processing to the tracking operation processing.

Specifically, the calculation point updating unit 19 updates the position of each of a group of calculation points whose determined local motion vectors are the same as or similar to the moving-object motion vector to the position to which each of the calculation points is moved along the moving-object motion vector. The similarity of the vectors is determined using any known technique. For example, the similarity is determined based on the directions of two vectors (the angle defined between the vectors). Alternatively, for example, the similarity is determined based on the deviation between two vectors with respect to each of the direction and length.

The calculation points that are continuously used while the position of each of the calculation points is moved along the moving-object motion vector are referred herein to as "continuation calculation points". Meanwhile, a calculation point whose determined local motion vector is different from the moving-object motion vector is rearranged by placing a new position at a position in the vicinity of any of the continuation calculation points.

Figure 7A:
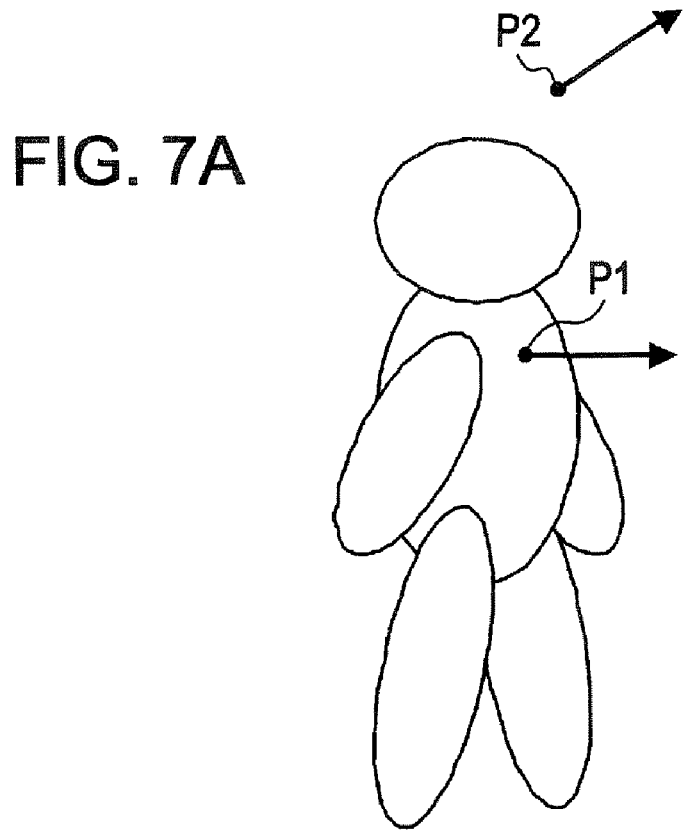
FIGS. 7A and 7B are diagrams showing the rearrangement of a calculation point.
Figure 7B:
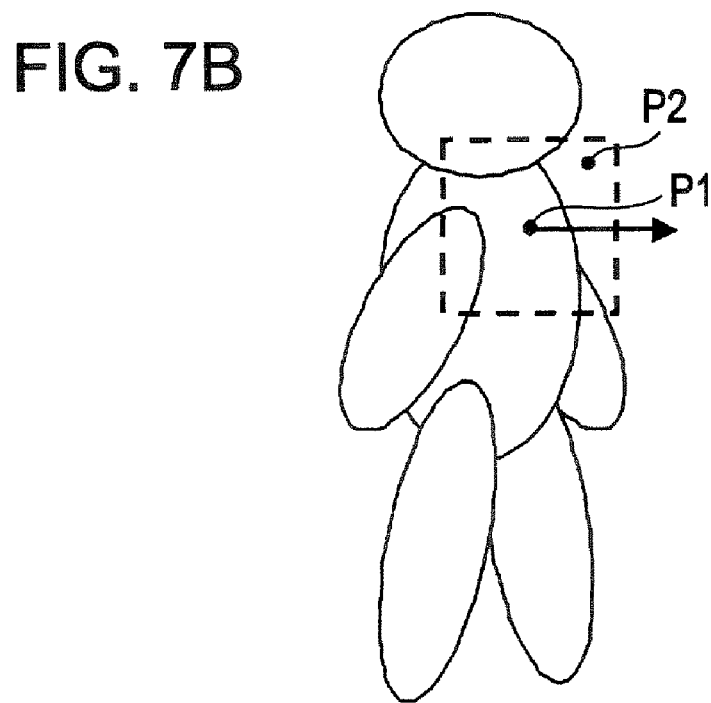

The rearrangement of a calculation point will be described with reference to FIGS. 7A and 7B. In FIGS. 7A and 7B, for the convenience of illustration, only two calculation points are shown.

FIG. 7A shows an example of local motion vectors determined for calculation points P1 and P2 at a certain time.

In this example, the calculation point P1 is an example of the continuation calculation point. The calculation point P2 is an example of the calculation point to be rearranged. As shown in FIG. 7A, the calculation point P2 is positioned far from a moving target, and the direction of the determined local motion vector greatly differs from that of the local motion vector of the calculation point P1.

FIG. 7B shows an example in which the calculation point P2 are relocated to a position in the vicinity of the continuation calculation point P1. While, for the convenience of illustration, the calculation point P2 is rearranged in the vicinity of the continuation calculation point P1, the calculation point P2 may be rearranged in the vicinity of any other existing continuation calculation point. A region surrounded by the broken line in FIG. 7B represents a region in the vicinity of the continuation calculation point P1.

The rearranging method includes, for example, a method of randomly placing a new calculation point at a position in the vicinity of a continuation calculation point, placing a new calculation point at a position in the vicinity of a continuation calculation point according to a certain rule, and other methods. The rearrangement according to a certain rule includes, for example, an approach for placing a new calculation point according to a probability distribution (e.g., Gaussian distribution) centered at a continuation calculation point, an approach for placing a new calculation point at the centroid of a continuation calculation point, and other approaches. An appropriate approach is selected based on the situation depending on the use or the picture.

The imaging direction driving control unit 21 is a processing function for controlling the driving of the rotating stage 3 in accordance with the obtained moving-object motion vector. By controlling the driving of the rotating stage 3, the imaging direction of the imaging apparatus 5 can be controlled so that the moving target is not out of the angle of view of the imaging unit 7 (that is, so that the moving target is positioned within the angle of view). This control can be used in order to set the moving object within the angle of view as well as in order to allow the moving object to be constantly located at a designated position in the screen (e.g., at the center of the screen).

FIG. 8 shows images tracked in the imaging direction in accordance with the movement of a moving object.

Moving-Object Tracking Control Procedure

The tracking operation of the moving-object tracking control apparatus 9 will be described with respect to program control. The processing operation of the moving-object tracking control apparatus 9 is also executed according to a similar procedure.

Figure 9:
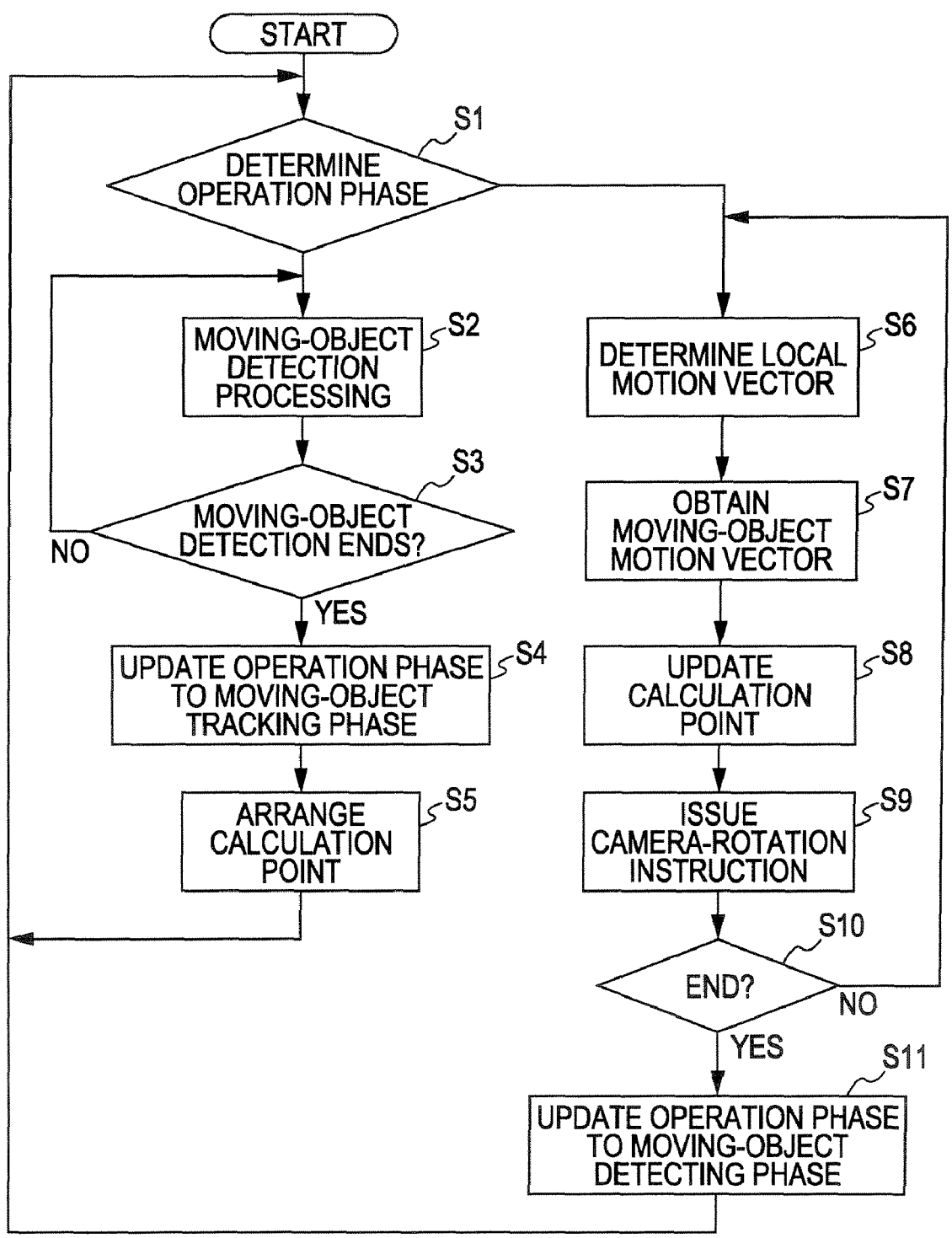
FIG. 9 is a diagram showing an example of a control procedure of a moving-object tracking program according to the first embodiment.

FIG. 9 shows an example of a control procedure of a program.

First, the program determines an operation phase (step S1). That is, the moving-object detecting phase or the moving-object tracking phase is determined.

In the initial state, the moving-object detecting phase is determined.

If the moving-object detecting phase is determined, the program executes moving-object detection processing using the known method described above (step S2). Then, the program determines whether or not the moving-object detection processing has been completed (step S3). The program repeatedly executes the moving-object detection processing until the moving-object detection processing has been completed (if a negative result is obtained).

When the moving-object detection processing has been completed, the program updates the operation phase to the moving-object tracking phase (step S4), and arranges calculation points for calculating local motion vectors on the detected moving-object region (step S5).

Thereafter, the program determines the operation phase again (step S1). Since the operation phase has been changed to the moving-object tracking phase, the program determines the local motion vectors for the individual located calculation points (step S6).

The program further obtains a moving-object motion vector based on the group of local motion vectors determined (step S7). As discussed above, the moving-object motion vector is determined using a frequency distribution or as a mean value.

Then, the program updates the position of a calculation point to be used to determine a local motion vector (step S8). As discussed above, a calculation point whose determined local motion vector is the same as or similar to the moving-object motion vector is updated to a new calculation point (continuation calculation point) at the position to which the calculation point is moved from the current position along the moving-object motion vector. A calculation point whose determined local motion vector is different from the moving-object motion vector is updated by eliminating the current position of the calculation point and by establishing or relocating a new calculation point at a position in the vicinity of any continuation calculation point. The calculation point is merely rearranged, and the number of calculation points does not increase or decrease.

Then, the program issues a rotation instruction for rotating the rotating stage 3 by the angle in accordance with the determined moving-object motion vector (step S9). That is, the imaging apparatus 5 is rotated to change the imaging direction so that the moving target in motion can be tracked. By repeating this rotation operation, the moving target to be tracked can be constantly displayed in the center of the screen.

FIGS. 10A and 10B show examples of the display. FIGS. 10A and 10B each illustrate four images captured at time t1 to t4, for which local motion vectors are determined. FIG. 10A shows images captured when the moving target is not tracked. FIG. 10B shows images captured when the moving target is tracked.

Then, the program executes termination determination processing (step S10). In the termination determination processing, it is determined whether or not the tracking operation is to continue. For example, if the moving target being tracked is within the imaging coverage, it is determined that the tracking operation is to continue. On the other hand, for example, if the imaging apparatus 5 loses track of the moving target being tracked (if the moving target moves outside the imaging coverage) or if the moving target is beyond the limit of the rotation angle (beyond the available tracking range), it is determined that the tracking operation is to terminate.

In any case, if a negative result is obtained in the termination determination processing, the program proceeds to the processing for determining a local motion vector for the updated calculation point (step S6).

The termination determination processing may be carried out based on not only the imaging state or mechanical limit but also the tracking time. For example, the tracking operation may be terminated when a certain period of time has elapsed since the start of the moving-object tracking phase. Alternatively, the continuation or termination of the tracking operation may be determined based on a result of a combination of the above-described imaging state or mechanical limit and the tracking time.

If an affirmative result is obtained in the termination determination processing, the program changes the operation phase to the moving-object detecting phase (step S11), and returns to the step, where the operation phase is determined again.

Advantages

In the moving-object tracking system according to the first embodiment, therefore, the position of each of calculation points defined on the moving-object region detected in the moving-object detecting phase (in a state where the imaging direction is fixed) is updated in accordance with the movement of the moving target. Thus, even in the moving-object tracking phase, the moving target can be tracked with less computation than the related art.

FIGS. 11A and 11B schematically show the difference in the amount of computation needed between the related art and this embodiment. FIGS. 11A and 11B each illustrate local motion vectors that are determined for four images captured at time t1 to t4.

FIG. 11A shows the local motion vectors determined by a method of the related art, and FIG. 11B shows those determined by the method of the first embodiment. As is apparent from the comparison between FIGS. 11A and 11B, the number of local motion vectors to be calculated in the first embodiment is greatly smaller than that of the related art. That is, it is to be understood that the amount of computation needed in the first embodiment is less than the related art.

In addition, the calculation points are reused repeatedly in the moving-object tracking method. Thus, the moving target can be tracked with less susceptibility to the effect of other moving objects near the moving target.

Figure 12:
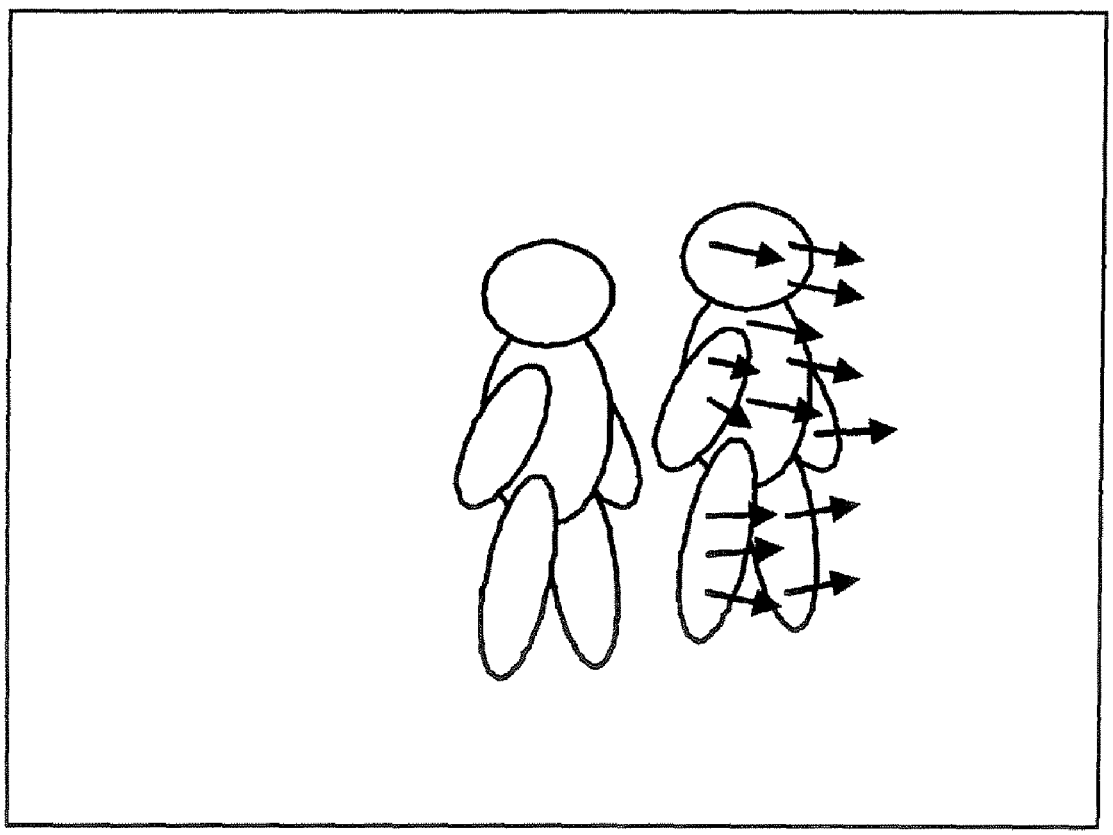
FIG. 12 is a diagram showing an example of the determination of local motion vectors in a case where another moving object exists near the moving target to be tracked.

FIG. 12 shows an example in which another moving object exists near a moving target to be tracked. In FIG. 12, the right person in the two persons is being tracked.

In the method of the related art, local motion vectors are determined for the target and its surrounding area during the moving-object tracking operation. Thus, the determination of the moving-object motion vector for the right person is affected by the local motion vectors for the left person.

In the method of the first embodiment, in contrast, only calculation points positioned on the right person are used to perform the tracking processing during the tracking operation. Thus, even if another person moves toward the left of the target person, the right person can continuously tracked in a stable manner.

Second Embodiment

In the first embodiment, only the rotation of the imaging apparatus is controlled based on the detected moving-object motion vector.

In a situation where an intruder is monitored using a moving-object tracking system, once a moving object is initially detected (in a moving-object detection mode), the lens of the imaging apparatus is often set to the wide-angle position to monitor a wide range. When the detected intruder is tracked, on the other hand, the lens of the imaging apparatus is zoomed in to show the intruder at a larger size in order to provide a detailed image of the intruder.

Further, as the intruder moves closer to or farther from the imaging apparatus, it is necessary to adjust the zoom of the lens of the imaging apparatus by zoom in or out to provide the image of the intruder with the desired size.

For example, in FIGS. 13A and 13B, a change in images captured when an intruder moves farther from the photographer for a period from time t1 to time t4 is illustrated. FIG. 13A shows the images of the intruder captured without zoom. The size of the subject on the screen decreases with the elapse of time. FIG. 13B shows the images of the intruder captured after the zoom adjustment. Due to the zoom adjustment, the size of the subject on the screen does not change.

Accordingly, the imaging apparatus used in the moving-object tracking system may have the zoom adjustment function depending on the application.

In the imaging apparatus having the zoom adjustment function, local motion vectors determined for a group of calculation points include the translation components and the scaling components. In the second embodiment, a mechanism capable of stably determining a moving-object motion vector (local motion vector) in association with the zoom adjustment during a moving-object tracking process will be described.

Structure of Moving-Object Tracking Control Apparatus

The structure of the moving-object tracking system according to the second embodiment is basically the same as that shown in FIG. 3. A specific feature of the second embodiment is that the moving-object tracking control apparatus 9 has a function for adjusting the zoom of the lens.

Figure 14:
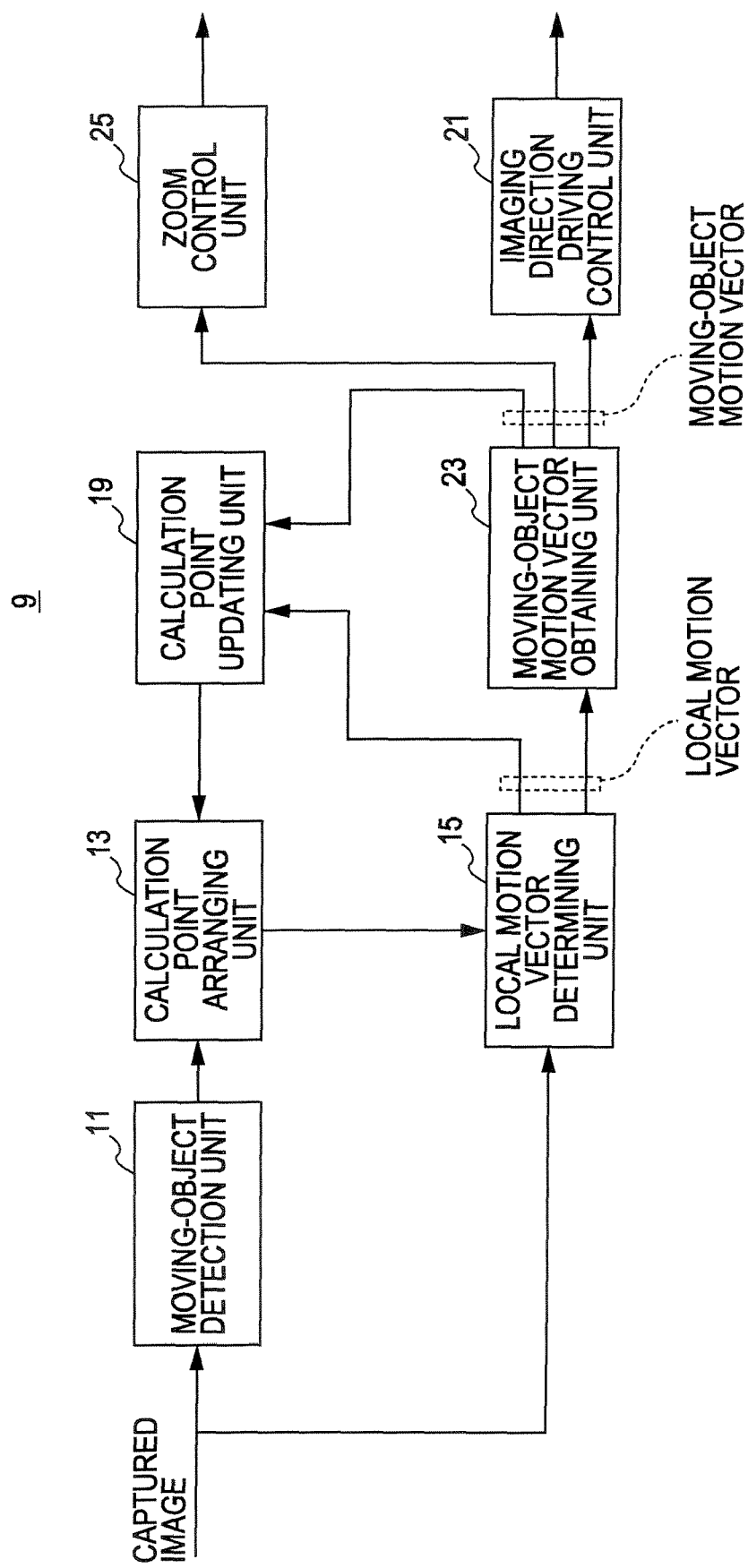
FIG. 14 is a diagram showing an example functional structure of a moving-object tracking control apparatus according to a second embodiment of the present invention.

FIG. 14 shows an example functional structure of the moving-object tracking control apparatus 9. In FIG. 14, the same reference numerals are assigned to the corresponding components to those shown in FIG. 4.

The moving-object tracking control apparatus 9 includes function units, that is, a moving-object detection unit 11, a calculation point arranging unit 13, a local motion vector determining unit 15, a moving-object motion vector obtaining unit 23, a calculation point updating unit 19, an imaging direction driving control unit 21, and a zoom control unit 25.

The feature which is specific to the second embodiment is the structure of the moving-object motion vector obtaining unit 23 and the zoom control unit 25. The zoom control unit 25 is a processing function for controlling the driving of a zoom lens of the imaging apparatus 5 in accordance with vector components of the moving-object motion vector with respect to the far-and-near direction.

The details of the processing for the moving-object motion vector obtaining unit 23 will be described. A local motion vector to be processed includes a scaling vector component in the scaling-up or scaling-down direction.

In the second embodiment, the moving-object motion vector obtaining unit 23 applies an affine transformation or a projective transformation to the group of local motion vectors to determine the moving-object motion vector.

Examples of the affine transformation coefficients used in the affine transformation are shown as follows:

$$x' = a \cdot x + b \cdot y + c$$

$$y' = d \cdot x + e \cdot y + f$$

The variables x and y correspond to the coordinates of a calculation point before applying the affine transformation, and the values x' and y' correspond to the coordinates of the calculation point after applying the affine transformation. The values a, b, c, d, e, and f are the affine transformation coefficients.

Given local motion vectors fx and fy, the coordinates of the calculation point after the moving object has moved are given by $(x', y') = (x+fx, y+fy)$.

In the six affine transformation coefficients, c and f are the translation components, and a, b, d, and e are the scaling components. That is, the affine transformation coefficients c and f are the moving-object motion vectors.

The moving-object motion vector obtaining unit 23 determines these six affine transformation coefficients.

The affine transformation coefficients may be determined from a group of local motion vectors by using an approximation technique such as the least-squares method. The following is an example of the application of the least-squares approximation method:

If the coordinates giving n calculation points are represented by $(x1, y1), (x2, y2), \ldots, (xn, yn)$ and the local motion vectors are represented by $(fx1, fy1), (fx2, fy2), \ldots, (fxn, fyn)$, the coordinates of the calculation points after the moving object has moved are represented by $(x1+fx1, y1+fy1), (x2+fx2, y2+fy2), \ldots, (xn+fxn, yn+fyn)$.

Adding a constant term to the coordinates of the calculation points given by the two-dimensional local motion vectors leads to three-dimensional coordinates, and the results are expressed by an n×3 matrix as follows:

x1 x2 ... xn x1+fx1 x2+fx1 ... xn+fxn
A=y1 y2 ... yn

B=y1+fy1 y2+fy1 ... yn+fyn 1 1 ... 1
1
1 ...
1

Likewise, a constant term is added to the affine transformation coefficients, and the results are expressed by a 3×3 matrix as follows:

$$C = \begin{matrix} a & b & c \\ d & e & f \\ 1 & 1 & 1 \end{matrix}$$

These three matrices satisfy the following relation:

$$CA=B \qquad \text{Eq. 1}$$

Multiplying the calculation points by the affine transformation coefficients leads to the transformed calculation points after the moving object has moved. By modifying Eq. 1 to determine the matrix C, the following equation is obtained:

$$C=BA^T(AA^T)^{-1} \qquad \text{Eq. 2}$$

where the superscript T denotes a transposed matrix, and −1 denotes an inverse matrix. Since the matrices A and B are known, the matrix C, i.e., the affine transformation coefficients, is determined by calculating Eq. 2.

In order to remove the effect of a local motion vector whose obtained value is incorrect, a local motion vector with a large difference from the determined affine transformation coefficients may be removed, and the affine transformation coefficients may be re-calculated. Further, this operation may be repeatedly performed to more precisely determine the affine transformation coefficients.

Moving-Object Tracking Control Procedure

The tracking operation of the moving-object tracking control apparatus 9 will be described with respect to program control. The processing operation of the moving-object tracking control apparatus 9 is also executed according to a similar procedure.

Figure 15:
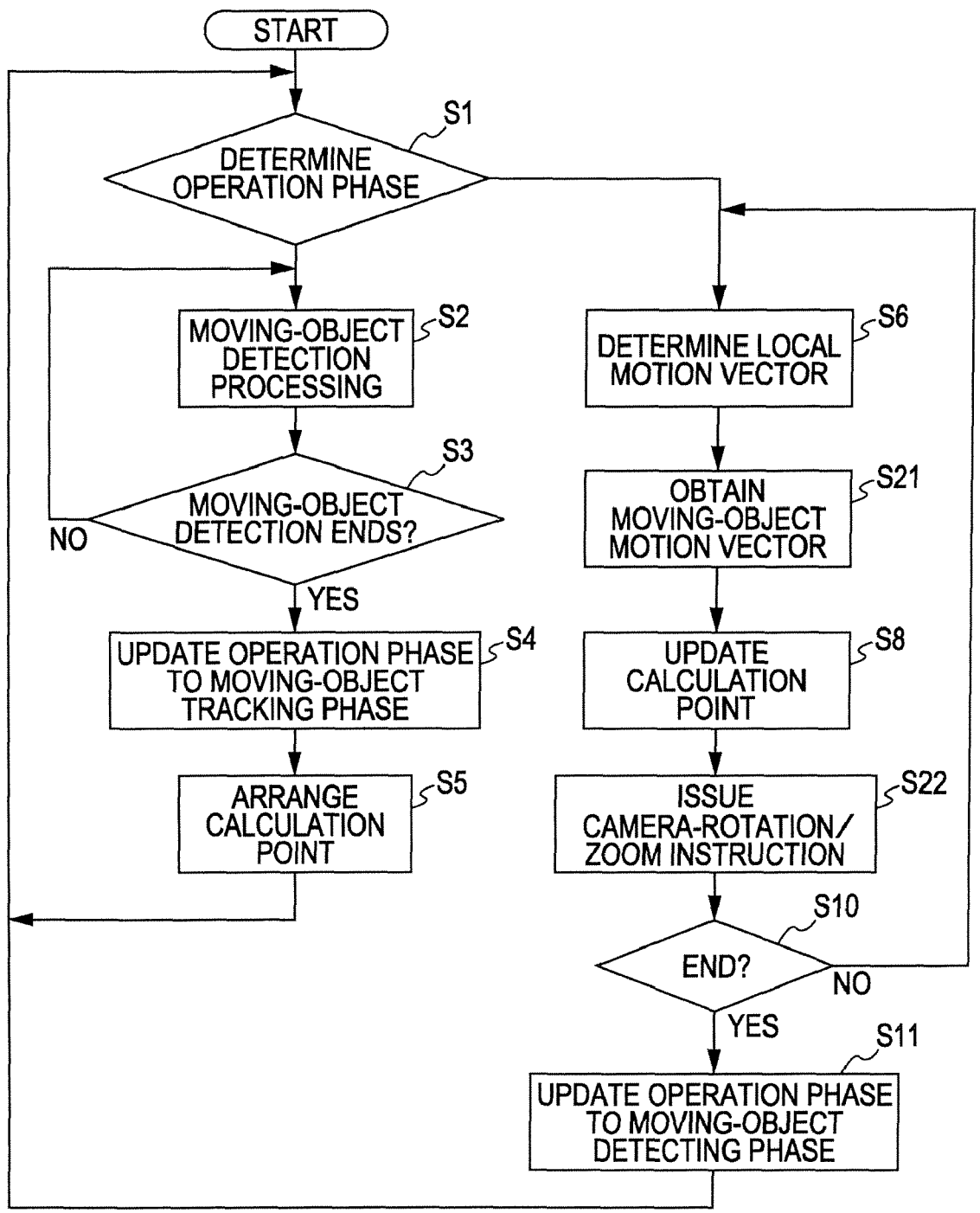
FIG. 15 is a diagram showing an example of a control procedure of a moving-object tracking program according to the second embodiment.

FIG. 15 shows an example of a control procedure of a program. In FIG. 15, the same reference numerals are assigned to the corresponding steps to those shown in FIG. 9. The operation procedure is basically the same as that of the first embodiment.

First, the program determines an operation phase (step S1).

If the moving-object detecting phase is determined, the program executes moving-object detection processing in a state where the imaging direction is fixed (step S2). Then, the program determines whether or not the moving-object detection processing has been completed (step S3). The program repeatedly executes the moving-object detection processing until the moving-object detection processing has been completed (if a negative result is obtained).

When the moving-object detection processing has been completed, the program updates the operation phase to the moving-object tracking phase (step S4), and arranges calculation points for calculating local motion vectors on the detected moving-object region (step S5).

Thereafter, the program determines the operation phase again (step S1). Since the operation phase has been changed to the moving-object tracking phase, the program determines the local motion vectors for the individual located calculation points (step S6).

The program further obtains a moving-object motion vector based on the group of local motion vectors determined (step S21). The program performs an affine transformation to determine the moving-object motion vector.

Then, the program updates the position of a calculation point to be used to determine a local motion vector (step S8). As discussed above, a calculation point whose determined local motion vector is the same as or similar to the moving-object motion vector is updated to a new calculation point (continuation calculation point) at the position to which the calculation point is moved from the current position along the moving-object motion vector. A calculation point whose determined local motion vector is different from the moving-object motion vector is updated by eliminating the current position of the calculation point and by establishing or relocating a new calculation point at a position in the vicinity of any continuation calculation point. The calculation point is merely rearranged, and the number of calculation points does not increase or decrease.

Then, the program issues a rotation instruction for rotating the rotating stage 3 by the angle in accordance with the determined moving-object motion vector (step S22). That is, the imaging apparatus 5 is rotated to change the imaging direction so that the moving target in motion can be tracked. The program further issues an instruction for adjusting the amount of zoom on the lens in accordance with the determined scaling components (step S22).

By repeating the combination of operations, the moving target to be tracked can be constantly displayed in the center of the screen with the desired size.

Then, the program executes termination determination processing (step S10).

If a negative result is obtained in the termination determination processing, the program proceeds to processing for determining a local motion vector for the updated calculation point (step S6).

If an affirmative result is obtained in the termination determination processing, the program changes the operation phase to the moving-object detecting phase (step S11), and returns to the step, where the operation phase is determined again.

Advantages

In the moving-object tracking system according to the second embodiment, therefore, even during a tracking operation with zoom in/out, a stable tracking operation can be achieved with a small amount of computation.

Further, also in the moving-object tracking system according to the second embodiment, the tracking operation can be performed without being affected by another moving object near the moving target to be tracked.

In the moving-object tracking system according to the second embodiment, furthermore, the zoom function allows a user to capture an image of an object with the desired size during the tracking operation.

Other Embodiments

In the foregoing embodiments, a calculation point whose determined local motion vector is different from a moving-object motion vector is immediately rearranged.

A certain period of time may be suspended until the rearrangement is performed. For example, a certain coefficient (continuation coefficient) is set for each of calculation points. The continuation coefficient is set to a predetermined initial value when a new calculation point is arranged or an existing calculation point is rearranged.

For a calculation point whose calculated local motion vector is the same as or similar to the moving-object motion vector, a value is added to the continuation coefficient. Conversely, for a calculation point whose calculated local motion vector is different from the moving-object motion vector, a value is subtracted from the continuation coefficient. When the value of the continuation coefficient becomes zero or negative, the corresponding calculation point is rearranged. Using this method, a certain suspended period of time can be provided for the rearrangement processing.

FIG. 16 illustrates images of the processing. In FIG. 16, a calculation point P1 is a continuation calculation point (whose local motion vector is the same as or similar to the moving-object motion vector). A calculation point P2 is a calculation point whose determined local motion vector is different from the moving-object motion vector.

In the first and second embodiments, the calculation point P2 is rearranged immediately, namely, at time t2 (shown in (B) of FIG. 16). In this embodiment, the calculation point P2 is rearranged at time t3 (shown in (C) of FIG. 16).

The same value may or may not be used when increasing the continuation coefficient and when decreasing the continuation coefficient. For example, a larger value may be subtracted from the continuation coefficient when decreasing than when increasing. In this case, the period of time until the continuation coefficient is updated to zero or a negative value can be reduced when a different local motion vector from the moving-object motion vector is determined. The increasing and decreasing directions of the continuation coefficient may be reversed. That is, the calculation point may be rearranged when the continuation coefficient exceeds a certain threshold value (>0).

The upper limit of the range of addition may be set in the continuation coefficient to which a value is added each time the same or similar local motion vector as or to the moving-object motion vector is determined. That is, the upper limit is set for the variable range of the continuation coefficient, whereby, if a continuation calculation point is positioned far from the moving target, this calculation point can be quickly rearranged.

The continuation coefficient may be set to any numeric value. For example, the number of times the same or similar local motion vector as or to the moving-object motion vector is determined may be used.

The foregoing embodiments have been described in the context of a moving-object tracking system having the structure shown in FIG. 3. That is, in the foregoing description, the moving-object tracking control unit 9 is installed in the imaging apparatus 5.

Figure 17A:
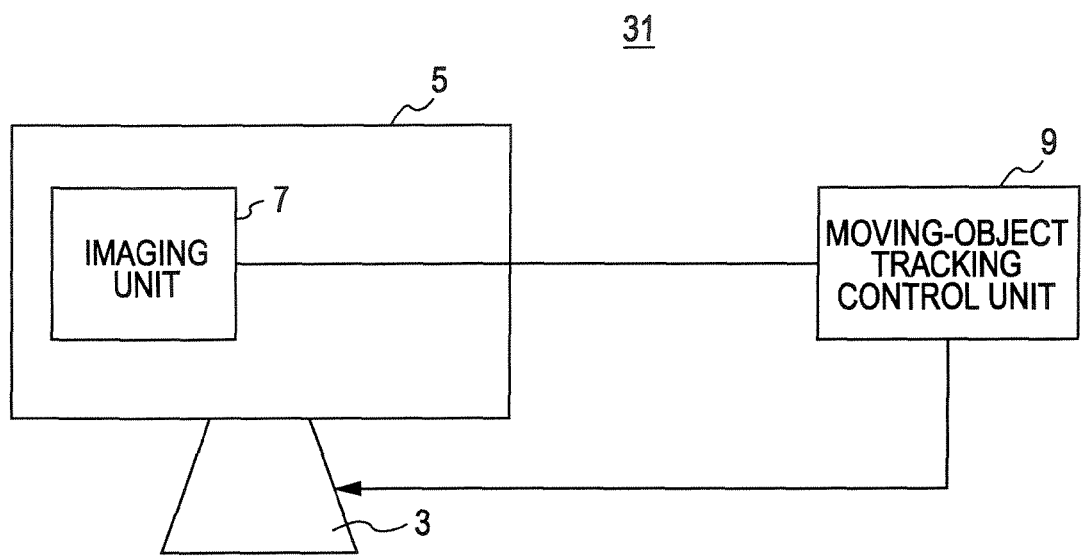
FIGS. 17A and 17B are diagrams showing example structures of moving-object tracking systems according to other embodiments of the present invention.
Figure 17B:
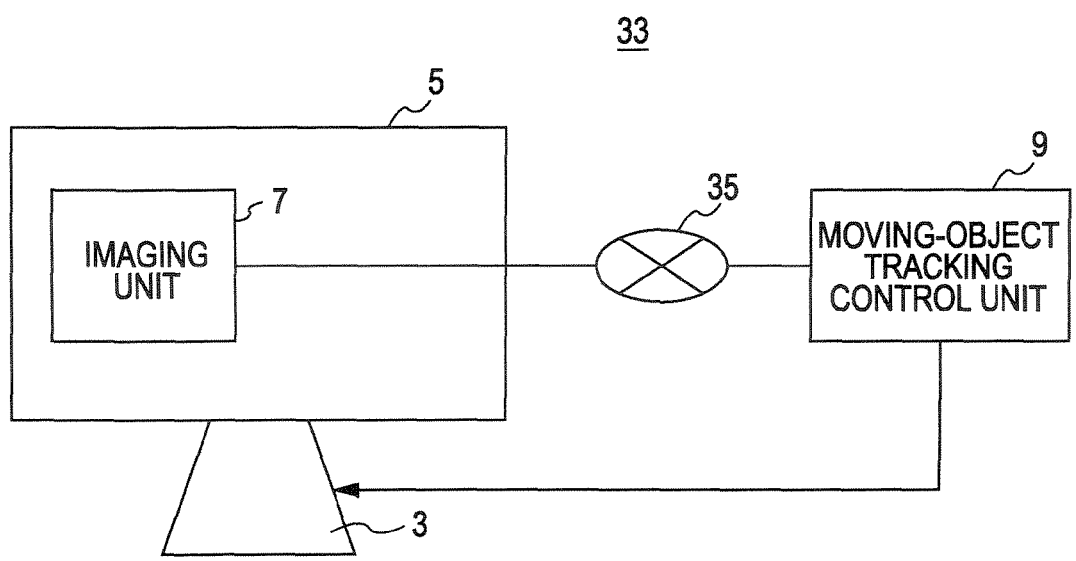

However, the moving-object tracking control unit 9 may not be installed in the imaging apparatus 5. FIGS. 17A and 17B show moving-object tracking systems according to other embodiments.

FIG. 17A shows a moving-object tracking system 31 having a structure in which a moving-object tracking control unit (or apparatus) 9 and an imaging apparatus 5 are separately provided and are connected via a communication line (wired or wireless). In the moving-object tracking system 31, the moving-object tracking control unit (or apparatus) 9 is implemented as a function on another information processing apparatus such as a computer.

FIG. 17B shows a moving-object tracking system 33 having a structure in which a moving-object tracking control unit (or apparatus) 9 and an imaging apparatus 5 are separately provided. In the moving-object tracking system 33, they are connected via a network 35.

While the foregoing embodiments have been described in the context in which the imaging apparatus is horizontally rotated, the imaging apparatus may be rotated vertically.

In the foregoing embodiments, the moving-object region on the screen is detected using known moving-object detection processing. However, a moving object or target to be tracked may be initially designated by an operator using a pointing tool.

While the foregoing embodiments have been described in connection with a monitoring system as an exemplary implementation of the moving-object tracking system, other applications of the system can be conceived. Embodiments of the present invention may be used in a wide variety of applications including systems for automatically tracking a moving object for recording or distribution, such as recordings of lectures, recordings of class lectures, and recordings of briefings.

In the foregoing embodiments, the imaging apparatus is rotated to change the imaging direction in accordance with the movement of the moving target, and the zoom setting on the lens is adjusted, if necessary.

However, a specific moving object may be tracked and a partial region of a captured image may be extracted in a state where the imaging direction of the imaging apparatus is fixed.

Figure 18A:
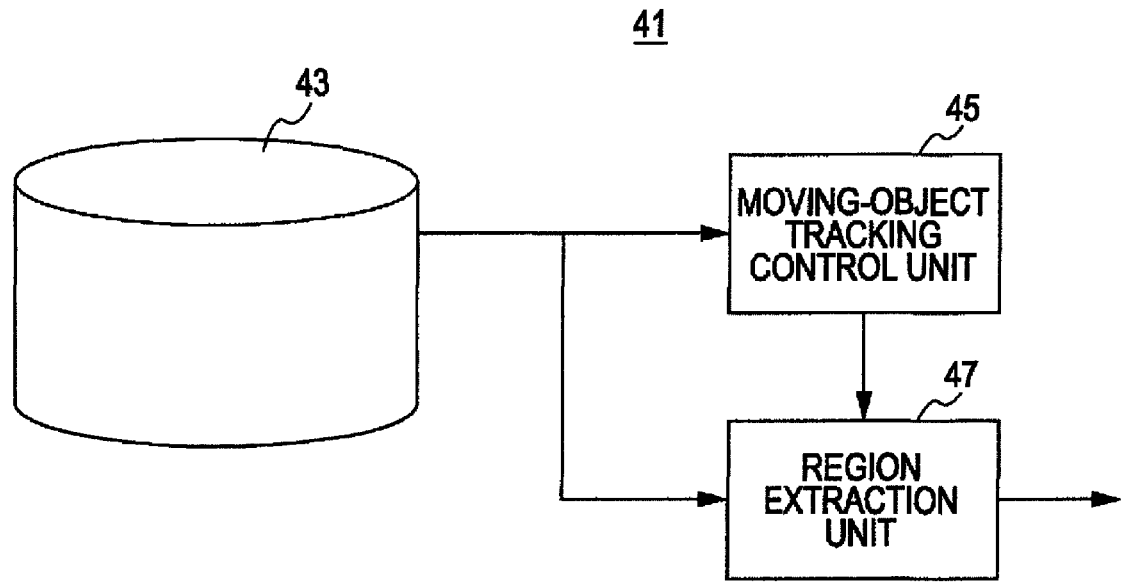
FIGS. 18A and 18B are diagrams showing example structures of moving-object tracking systems according to other embodiments of the present invention.
Figure 18B:
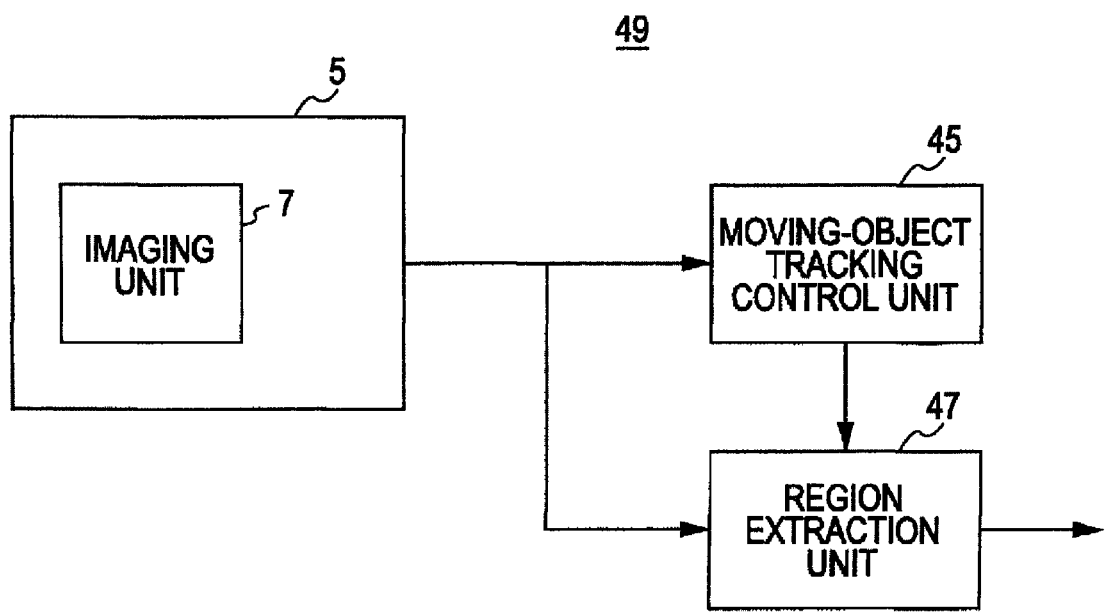

FIGS. 18A and 18B show example structures of moving-object tracking systems 41 and 49 of the type in which a partial region of a captured image screen is extracted, respectively. In FIGS. 18A and 18B, the same reference numerals are assigned to the corresponding portions to those shown in FIG. 3.

The moving-object tracking system 41 shown in FIG. 18A performs processing on a captured image read from a server (image data storage device) 43. In the moving-object tracking system 41, the read captured image is input to a moving-object tracking control unit 45 and a region extraction unit 47. The region extraction unit 47 implements a processing function for extracting from a screen the region associated with extracted-region information supplied from the moving-object tracking control unit 45.

The moving-object tracking system 49 shown in FIG. 18B performs processing on a captured image read from the imaging apparatus 5 that is not mounted on the rotating stage 3 (that is, an imaging apparatus whose imaging direction is fixed). Also in the moving-object tracking system 49, the output captured image is input to the moving-object tracking control unit 45 and the region extraction unit 47, and a partial region of the captured image screen is extracted and output in accordance with the movement of the moving target.

In the moving-object tracking systems 41 and 49, a background image may or may not include the motion vector components.

In either case, the above-described method for determining a moving-object motion vector may be used. Even when a background image does not include the motion vector components, the above-described method for determining a moving-object motion vector is used, thus achieving a significant reduction in the amount of computation during tracking of the moving target and a reduction of the effect from other moving objects located near the moving target.

An example structure of the moving-object tracking control unit 45 used in the moving-object tracking systems 41 and 49 and an example of a processing procedure will be briefly described.

Figure 19:
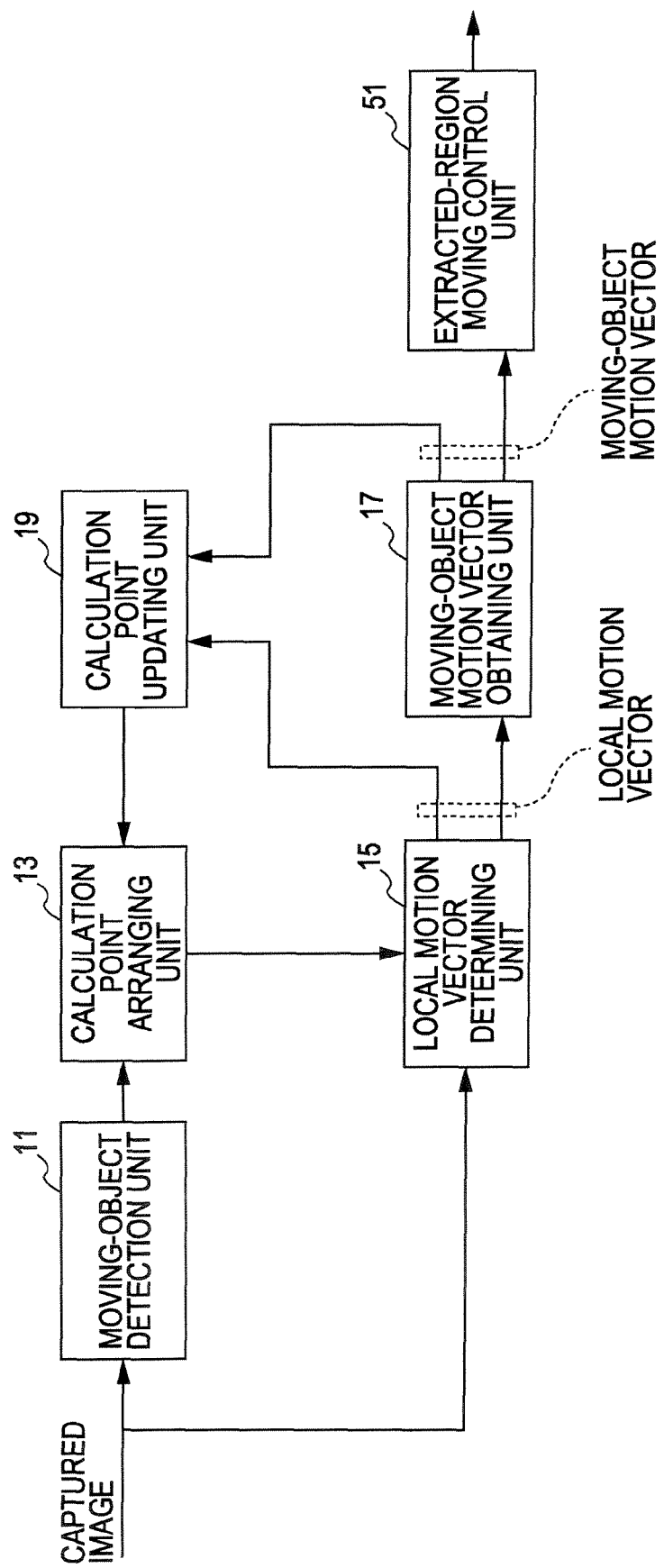
FIG. 19 is a diagram showing an example functional structure of a moving-object tracking control apparatus of the type in which a region is extracted.

FIG. 19 shows an example internal structure of the moving-object tracking control unit 45. In FIG. 19, the same reference numerals are assigned to the corresponding portions to those shown in FIG. 4.

The moving-object tracking control apparatus 45 includes functional units, that is, a moving-object detection unit 11, a calculation point arranging unit 13, a local motion vector determining unit 15, a moving-object motion vector obtaining unit 17, a calculation point updating unit 19, and an extracted-region moving control unit 51. The specific feature is the structure of the extracted-region moving control unit 51. The extracted-region moving control unit 51 corresponds to a processing function for controlling so as to move a region extracted from the image in accordance with the moving-object motion vector in order to extract the moving object. The difference from the foregoing embodiments is that the extracted region is moved in accordance with the moving-object motion vector.

Figure 20:
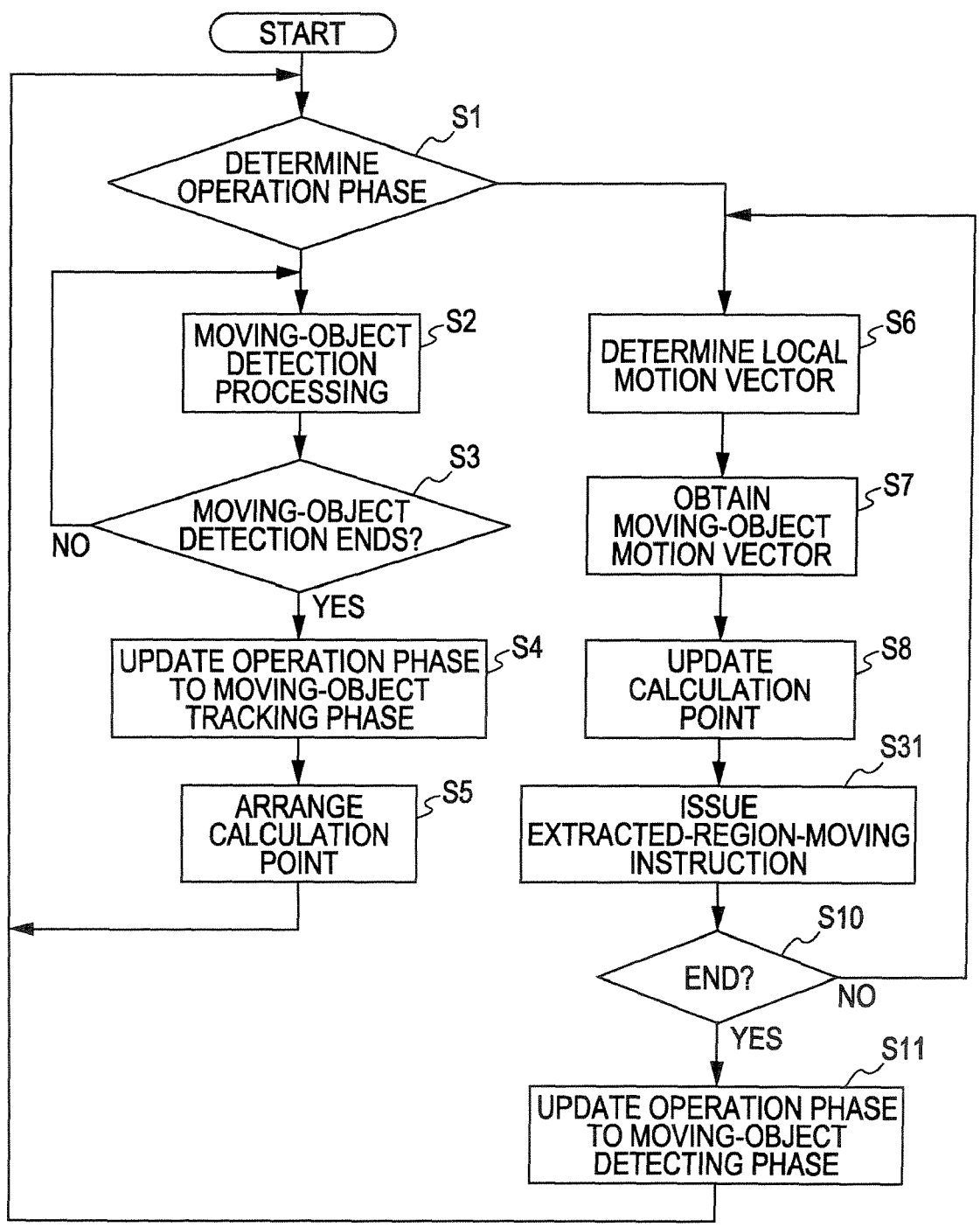
FIG. 20 is a diagram showing an example of a control procedure of a moving-object tracking program of the type in which a region is extracted.

FIG. 20 shows the tracking operation of the moving-object tracking control apparatus 45 with respect to program control. In FIG. 20, the same reference numerals are assigned to the corresponding steps to those shown in FIG. 9. Substantially all of the processing steps in the program control are the same as those shown in FIG. 9, and the difference is that an instruction for moving the extracted region is issued based on the moving-object motion vector (step S31). By repeating this tracking operation, the moving target to be tracked can be constantly displayed in the center of the screen.

The above-described tracking control program may be distributed via a network, or may be stored in a storage medium and distributed via the storage medium. The storage medium used for the distribution of the program includes a magnetic storage medium, an optical storage medium, a semiconductor storage medium, and other storage media.

A variety of modifications may be made to the foregoing embodiments without departing from the scope of the invention. Further, various modifications and applications may also be devised or combined in accordance with the embodiments disclosed herein.

It should be understood by those skilled in the art that various modifications, combinations, sub-combinations and alterations may occur depending on design requirements and other factors insofar as they are within the scope of the appended claims or the equivalents thereof.

What is claimed is:

1. A moving-object tracking control apparatus comprising:
a moving-object specifying unit that specifies a moving-object region on an image captured by an imaging apparatus;
a calculation point arranging unit that arranges a plurality of calculation points on the specified moving-object region;
a local motion vector determining unit that determines a group of local motion vectors for the calculation points;
a moving-object motion vector obtaining unit that obtains a moving-object motion vector based on the group of local motion vectors;
a calculation point updating unit that updates the calculation points including a group of calculation points whose determined local motion vectors are the same as or similar to the moving-object motion vector and calculation points whose determined local motion vectors are different from the moving-object motion vector,
the group of calculation points being continuously used to calculate the local motion vectors and being updated by moving the position of each of the group of calculation points along the moving-object motion vector,
each of the calculation points whose determined local motion vectors are different from the moving-object motion vector being rearranged by placing a new calculation point at a position in the vicinity of any of the continuously used calculation points; and
an imaging direction driving control unit that controls a movable mechanism including the imaging apparatus in accordance with the moving-object motion vector.

2. The moving-object tracking control apparatus according to claim 1, wherein the calculation point arranging unit arranges the calculation points randomly throughout the moving-object region.

3. The moving-object tracking control apparatus according to claim 1, wherein the calculation point arranging unit arranges the calculation points uniformly on the moving-object region.

4. The moving-object tracking control apparatus according to claim 1, wherein the calculation point arranging unit arranges the calculation points in the vicinity of a feature point in the moving-object region.

5. The moving-object tracking control apparatus according to claim 1, wherein the moving-object motion vector obtaining unit determines the local motion vector with the highest frequency of occurrence in the group of local motion vectors as the moving-object motion vector.

6. The moving-object tracking control apparatus according to claim 1, wherein the moving-object motion vector obtaining unit determines an arithmetic approximation determined with respect to the group of local motion vectors-as the moving-object motion vector.

7. The moving-object tracking control apparatus according to claim 1, wherein the calculation point updating unit randomly places the new calculation points at position in the vicinity of an arbitrary calculation point of the continuously used calculation points.

8. The moving-object tracking control apparatus according to claim 1, wherein the calculation point updating unit places the new calculation points according to a probability distribution centered at an arbitrary calculation point of the continuously used calculation points.

9. The moving-object tracking control apparatus according to claim 1, wherein the calculation point updating unit places the new calculation points at the centroids of all of the continuously used calculation points.

10. The moving-object tracking control apparatus according to claim 1, wherein the calculation point updating unit refers to a continuation coefficient corresponding to each of the calculation points to determine whether each of the calculation points are to be continuously used or rearranged, and continuously uses or rearranges each of the calculation points based on the value of the continuation coefficient.

11. The moving-object tracking control apparatus according to claim 10, wherein:
the continuation coefficient is set to an initial value when a new calculation point is placed or a calculation point is rearranged;
a first update value is added to the continuation coefficient when the local motion vector corresponding to the calculation point is the same as or similar to the moving-object motion vector; and
a second update value is subtracted from the continuation coefficient when the local motion vector corresponding to the calculation point is different from the moving-object motion vector.

12. The moving-object tracking control apparatus according to claim 1, further comprising a zoom control unit that controls a zoom lens of the imaging apparatus depending on the size of the moving-object region.

13. A moving-object tracking control apparatus comprising:

a moving-object specifying unit that specifies a moving-object region on an image captured by an imaging apparatus or a moving-object region on an image read from a server;

a calculation point arranging unit that arranges a plurality of calculation points on the specified moving-object region;

a local motion vector determining unit that determines a group of local motion vectors for the calculation points;

a moving-object motion vector obtaining unit that obtains a moving-object motion vector based on the group of local motion vectors;

a calculation point updating unit that updates the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and an extracted-region moving control unit that controls so as to move a region extracted from the image in accordance with the moving-object motion vector.

14. A moving-object tracking system comprising:

an imaging apparatus installed in a movable mechanism;

a moving-object specifying unit that specifies a moving-object region on an image captured by the imaging apparatus;

a calculation point arranging unit that arranges a plurality of calculation points on the specified moving-object region;

a local motion vector determining unit that determines a group of local motion vectors for the calculation points;

a moving-object motion vector obtaining unit that obtains a moving-object motion vector based on the group of local motion vectors;

a calculation point updating unit that updates the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and an imaging direction driving control unit that controls the movable mechanism in accordance with the moving-object motion vector.

15. A moving-object tracking system comprising:

an imaging apparatus;

a moving-object specifying unit that specifies a moving-object region on an image captured by the imaging apparatus;

a calculation point arranging unit that arranges a plurality of calculation points on the specified moving-object region;

a local motion vector determining unit that determines a group of local motion vectors for the calculation points;

a moving-object motion vector obtaining unit that obtains a moving-object motion vector based on the group of local motion vectors;

a calculation point updating unit that updates the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and an extracted-region moving control unit that controls so as to move a region extracted from the image in accordance with the moving-object motion vector.

16. A moving-object tracking system comprising:

a server that stores image data;

a moving-object specifying unit that specifies a moving-object region on an image read from the server;

a calculation point arranging unit that arranges a plurality of calculation points on the specified moving-object region;

a local motion vector determining unit that determines a group of local motion vectors for the calculation points;

a moving-object motion vector obtaining unit that obtains a moving-object motion vector based on the group of local motion vectors;

a calculation point updating unit that updates the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and an extracted-region moving control unit that controls so as to move a region extracted from the image in accordance with the moving-object motion vector.

17. A moving-object tracking control method comprising the steps of:

specifying a moving-object region on an image captured by an imaging apparatus;

arranging a plurality of calculation points on the specified moving-object region;

determining a group of local motion vectors for the calculation points;

obtaining a moving-object motion vector based on the group of local motion vectors;

updating the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and controlling a movable mechanism including the imaging apparatus in accordance with the moving-object motion vector.

18. A moving-object tracking control method comprising the steps of:

specifying a moving-object region on an image captured by an imaging apparatus or a moving-object region on an image read from a server;

arranging a plurality of calculation points on the specified moving-object region by a programmed processor;

determining a group of local motion vectors for the calculation points;

obtaining a moving-object motion vector based on the group of local motion vectors;

updating the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and controlling so as to move a region extracted from the image in accordance with the moving-object motion vector.

19. A computer readable medium storing a program that, when executed by a processor, causing a computer to execute the steps of:

specifying a moving-object region on an image captured by an imaging apparatus;

arranging a plurality of calculation points on the specified moving-object region;

determining a group of local motion vectors for the calculation points;

obtaining a moving-object motion vector based on the group of local motion vectors;

updating the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and controlling a movable mechanism including the imaging apparatus in accordance with the moving-object motion vector.

20. A computer readable medium storing a program that, when executed by a processor, causing a computer to execute the steps of:

specifying a moving-object region on an image captured by an imaging apparatus or a moving-object region on an image read from a server;

arranging a plurality of calculation points on the specified moving-object region;

determining a group of local motion vectors for the calculation points;

obtaining a moving-object motion vector based on the group of local motion vectors;

updating the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points; and controlling so as to move a region extracted from the image in accordance with the moving-object motion vector.

21. A moving-object tracking control apparatus comprising:

a moving-object specifying unit that specifies a moving-object region on an image captured by an imaging apparatus;

a calculation point arranging unit that arranges a plurality of calculation points on the specified moving-object region;

a local motion vector determining unit that determines a group of local motion vectors for the calculation points;

a moving-object motion vector obtaining unit that obtains a moving-object motion vector based on the group of local motion vectors; and a calculation point updating processing unit that updates the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points the obtained moving-object motion vector provides tracking control for a movable mechanism.

22. A moving-object tracking control apparatus comprising:

a moving-object specifying unit that specifies a moving-object region on an image captured by an imaging apparatus or a moving-object region on an image read from a server;

a calculation point arranging unit that arranges a plurality of calculation points on the specified moving-object region;

a local motion vector determining unit that determines a group of local motion vectors for the calculation points;

a moving-object motion vector obtaining unit that obtains a moving-object motion vector based on the group of local motion vectors; and a calculation point updating processing unit that updates the calculation points including a group of calculation points whose determined local motion vectors are the same as or similar to the moving-object motion vector and calculation points whose determined local motion vectors are different from the moving-object motion vector, the group of calculation points being continuously used to calculate the local motion vectors and being updated by moving the position of each of the group of calculation points along the moving-object motion vector, each of the calculation points whose determined local motion vectors are different from the moving-object motion vector being rearranged by placing a new calculation point at a position in the vicinity of any of the continuously used calculation points the obtained moving-object motion vector provides tracking control for a movable mechanism.

* * * * *